United States Patent Office 3,053,445
Patented Sept. 11, 1962

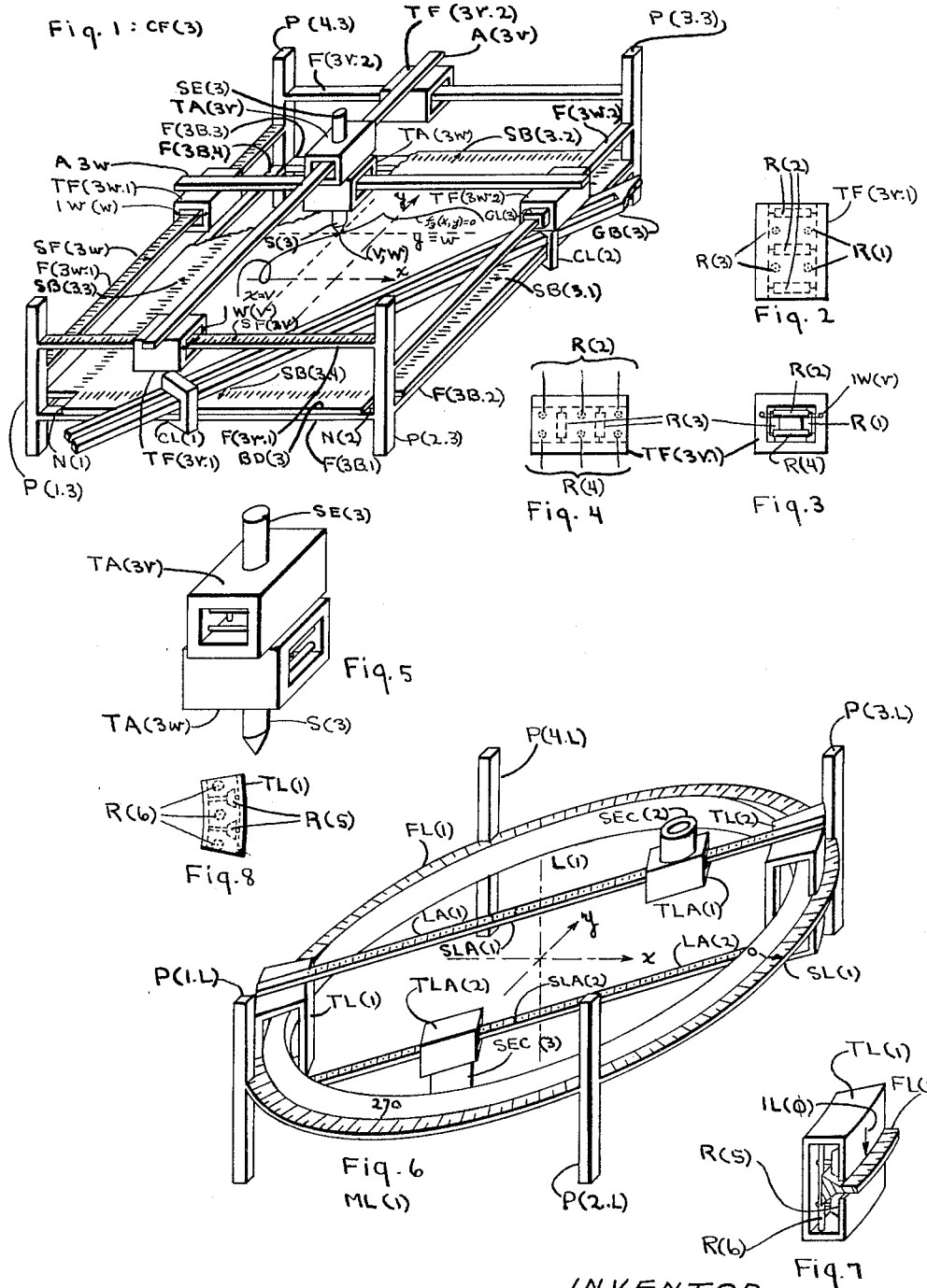

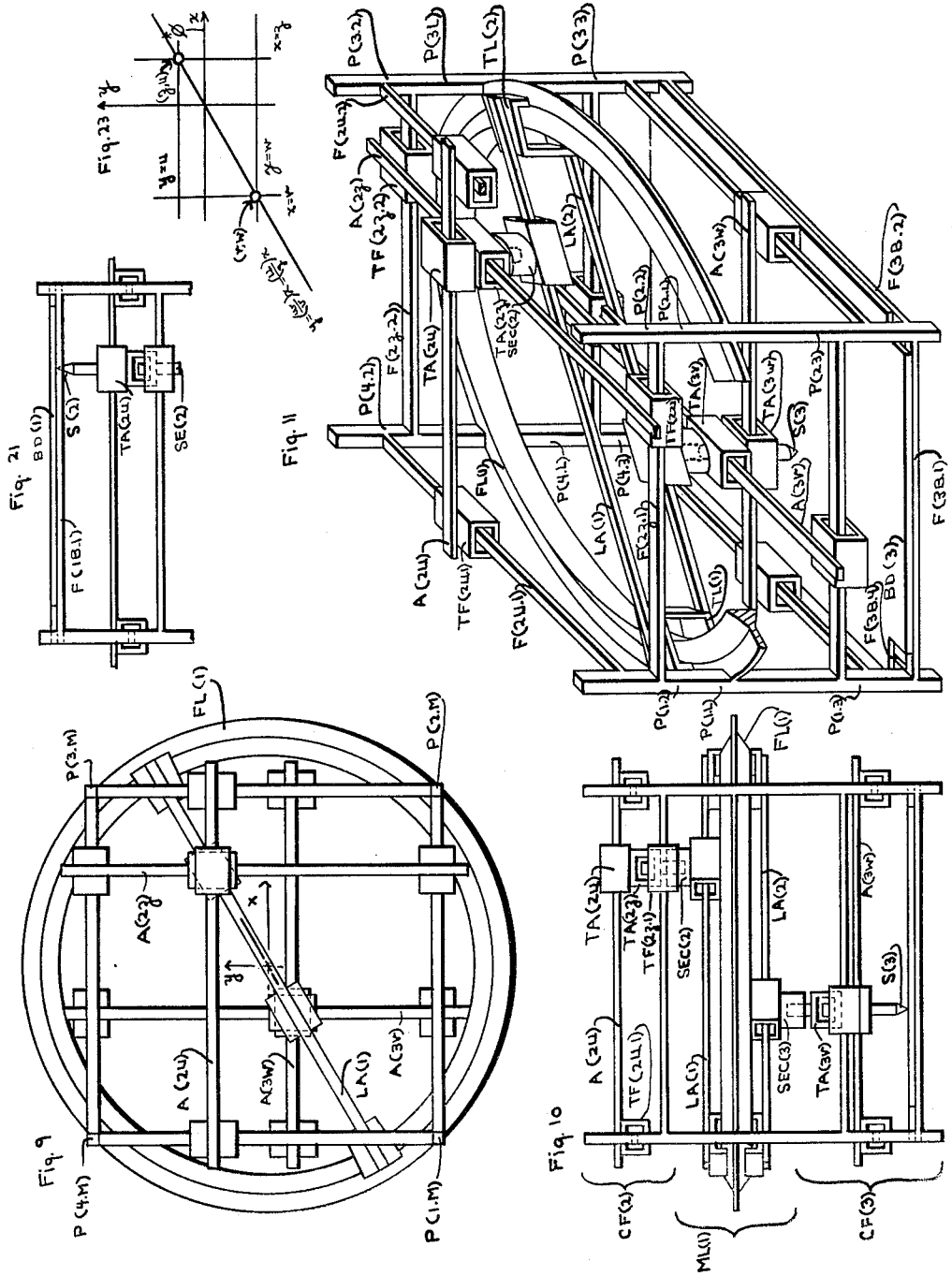

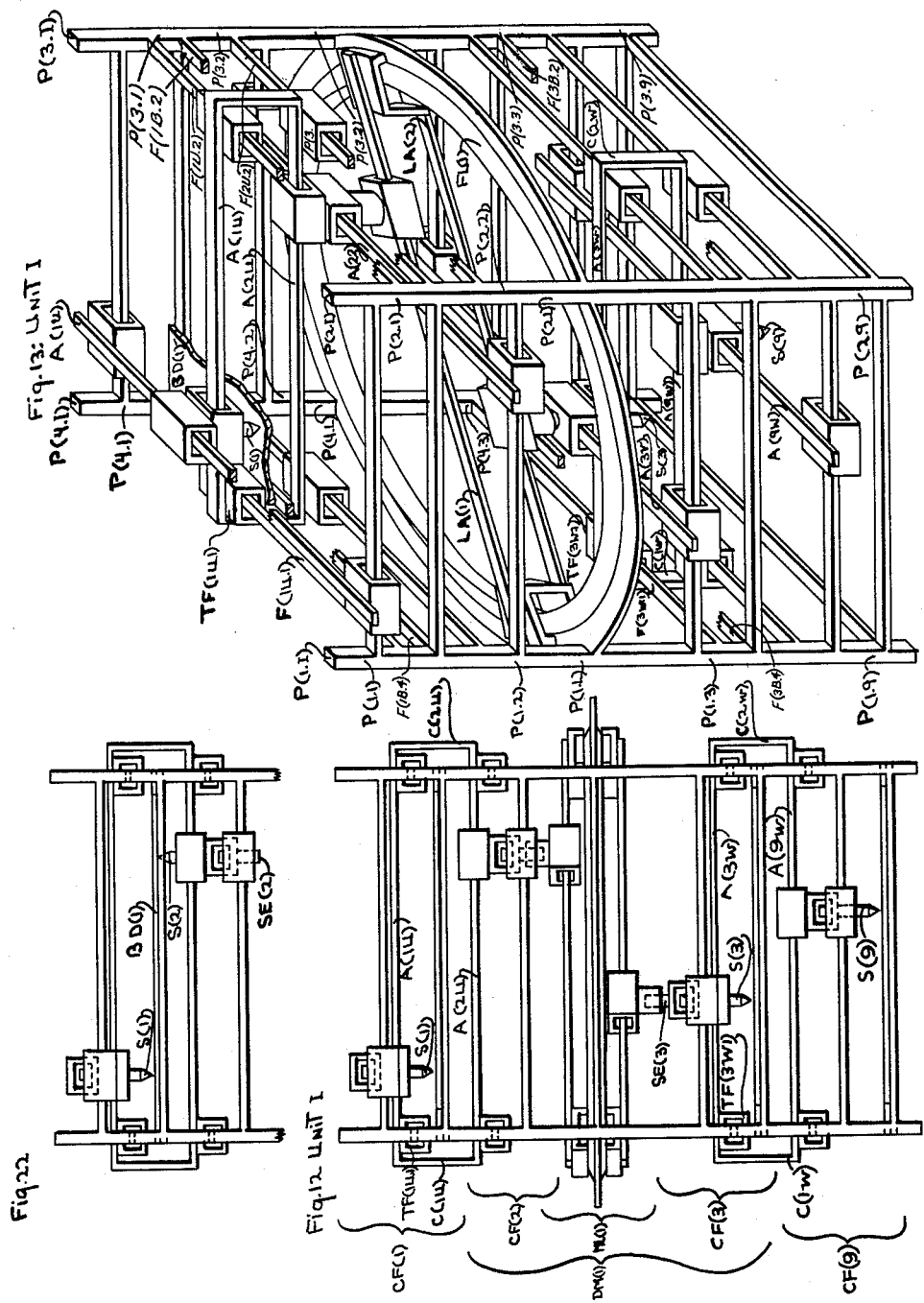

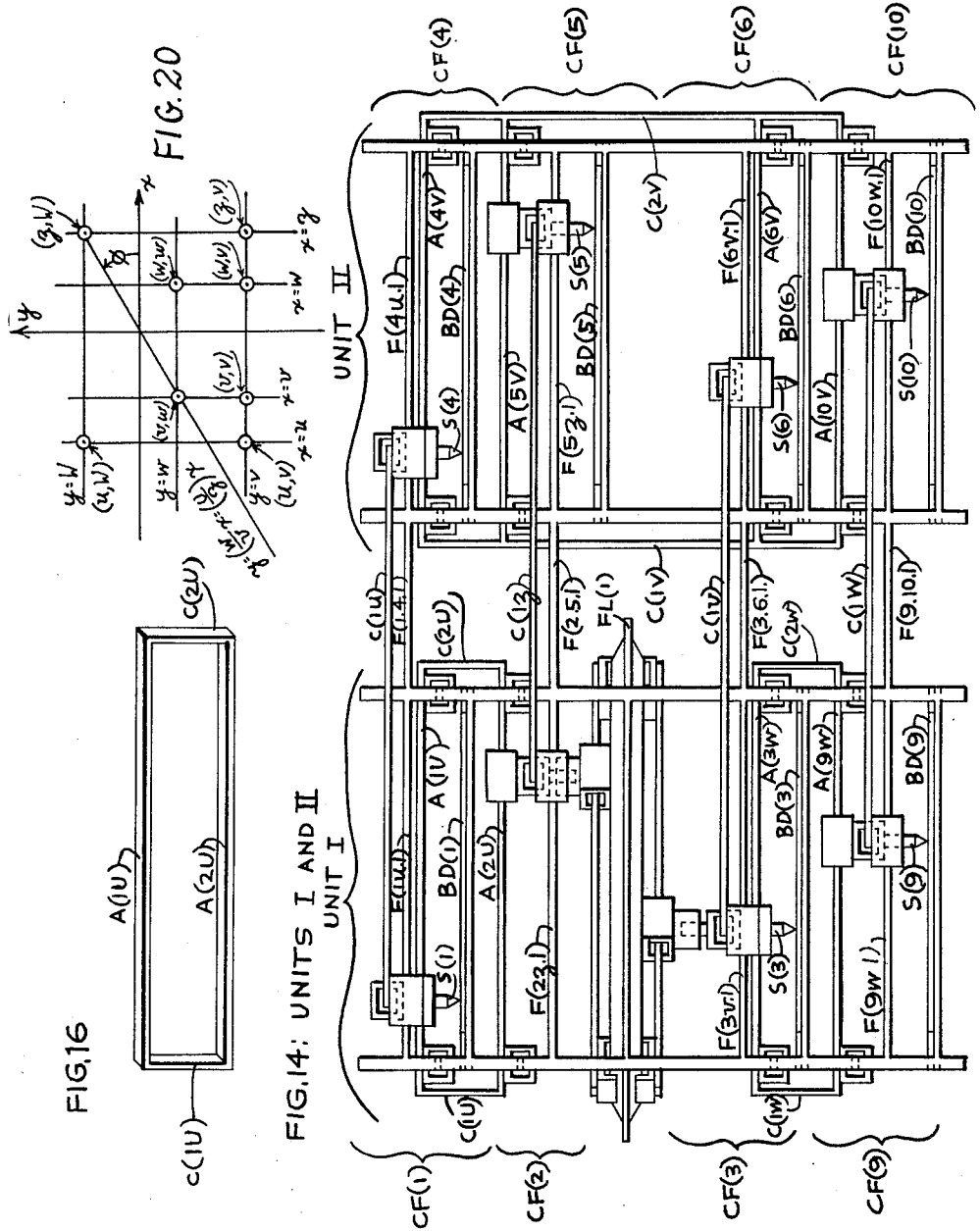

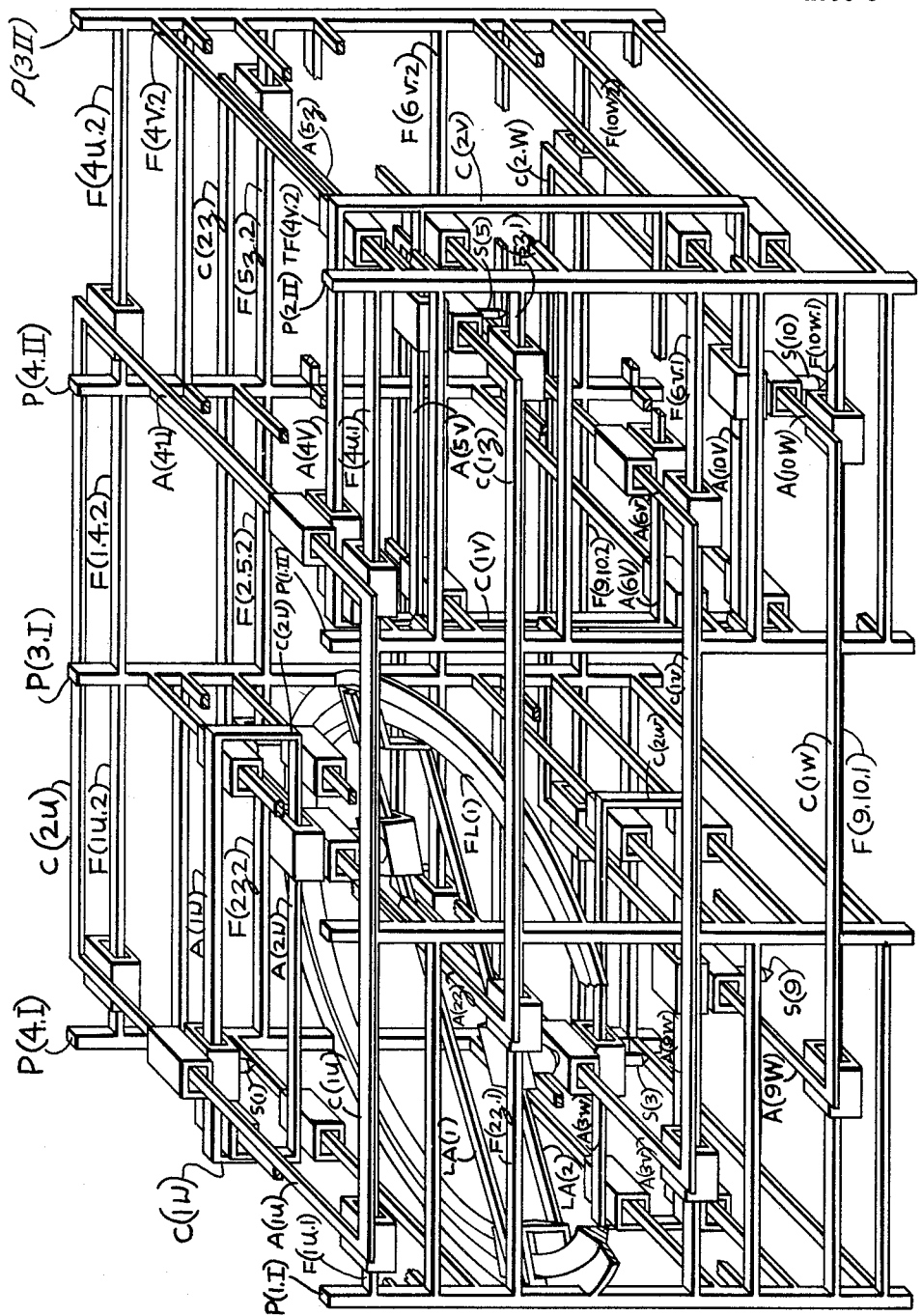

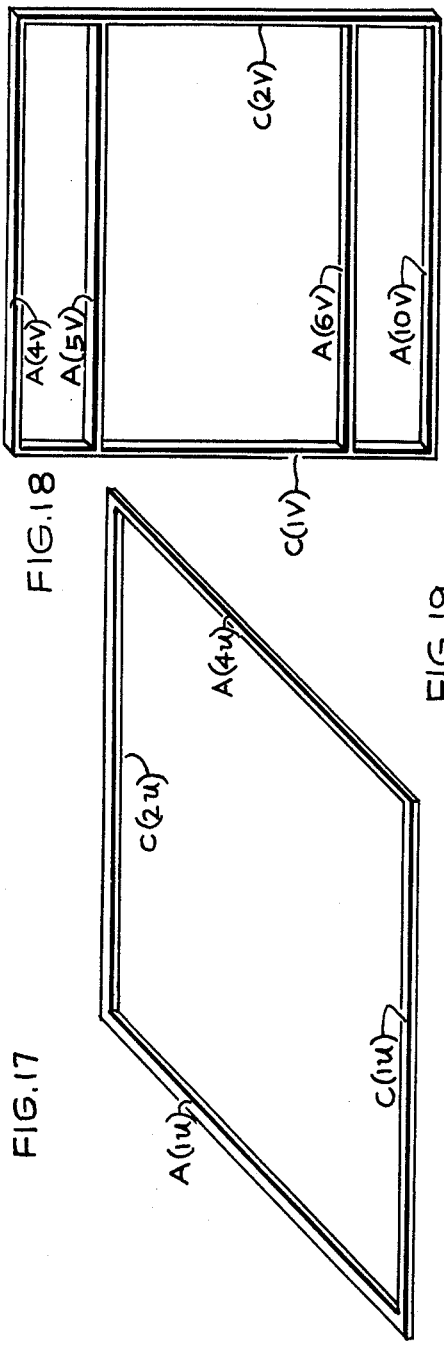
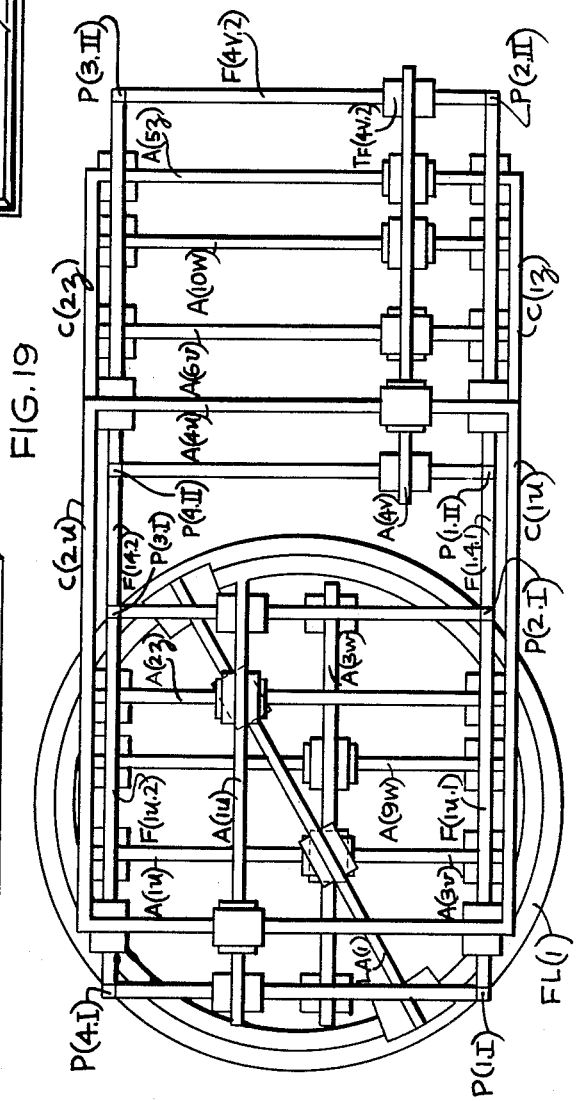
FIG.17
FIG.18
FIG.19

3,053,445
COMPUTING DEVICE
James H. Armstrong, 13509 Burbank Blvd.,
Van Nuys, Calif.
Filed Aug. 5, 1957, Ser. No. 676,090
6 Claims. (Cl. 235—61)

This invention relates to function generators, particularly to mechanical function generators. Generally, such instruments are limited to the construction of a small number of closely related functions of a single variable, such as sin $x$ or cos $x$, for example.

It is an object of this invention to provide a mechanism for generating any of a very large number of different functions of one or of several variables.

It is a further object of this invention to provide, in cases directly or primarily involving only two variables, a continuous record of the corresponding values of the variables, in the form of a graph drawn on paper or other suitable material, this graph to be easily available for further study or other use.

A third object of this invention is to provide a control mechanism for other instruments, in which, for example, one variable may be used to control as many as six others; or in which, for example, three variables may be used to control one, two, three, or four other variables, in any of an infinite number of ways. These variables may be pressures, temperatures, velocities, or any other natural states or conditions capable of being measured continuously on a numerical scale or they may be abstract mathematical entities, or any combination of these.

In its preferred embodiment the complete function generator and control mechanism designed to accomplish these and certain other objectives consists of a combination of eight interconnected curve followers, adjacent curve followers being connected to each other in two essentially different ways; that is, by means of movable and by means of rigid couplings. The two curve followers having two of their corresponding, movable parts joined by a movable link constitute, together with this movable link and an appropriate framework, what is called in the remainder of this paper a "double multiplier." For reasons of convenience of description, the double multiplier and two additional curve followers connected to it by means of essentially rigid connections together constittue what is called in the remainder of this paper "Unit I"; the remaining curve followers, connected to each other and to the four curve followers of Unit I by essentially rigid connections, together constitute "Unit II." Only two of the eight curve followers are connected to each other by means of an essentially movable coupling, these two forming the double multiplier, the double multiplier being part of Unit I, Units I and II together constituting the complete function generator and control mechanism, in its preferred embodiment. The rigid connections mentioned in this paragraph are, more specifically, between corresponding, movable parts of the curve followers involved. Thus, each of two rigidly connected curve followers contains, as an integral part, a part of at least one single, rigid, movable piece, this latter piece being common to both curve followers. There are, in the complete function generator and control mechanism, in its preferred embodiment, seven such pieces of three different kinds.

Each curve follower is primarily a device for relating, functionally, the directed distances of two of its movable parts from fixed reference points or for recording such a relation in the form of a graph. Essentially, each curve follower consists of a pencil, stylus, pin or other similar object supported by two straight, rigid, perpendicular stylus-supporting arms in such a way that the point of the stylus is free to follow any desired finite portion of any continuous plane curve, the plane of the curve being parallel to each of the stylus-supporting arms. These arms are themselves supported by an appropriate fixed, rigid, framework in such a way that each arm is free to move in a direction perpendicular to its longitudinal centerline.

If convenient, rectangular axes, parallel, respectively, to each of the stylus-supporting arms, are chosen on the plane of the curve over which the point of the stylus moves, then this curve may be defined by an equation $f(x, y) = 0$, and the projections on the $xy$ plane of the longitudinal centerlines of the stylus-supporting arms may be defined by the equations $x = v$, $y = w$, respectively, the point of the stylus being the point $(v, w)$, in which $v$ is a real variable representing the directed distance measured in convenient units on a plane parallel to the $xy$ plane, from a reference point fixed on the frame to the longitudinal centerline of one of the stylus-supporting arms and in the same way, $w$ is a real variable representing the directed distance from a second reference point to the longitudinal centerline of the other stylus-supporting arm. (Throughout this specification, the projection of a point on a plane is a point of the plane such that a line joining the two points is perpendicular to the plane. The projection of a line or a curve on a plane is made by projecting each of the points of the line or the curve.) By forcing the point of the stylus to follow some predetermined curve $f(x, y) = 0$, manually or otherwise, a constraint is imposed on the movements of the stylus-supporting arms such that their directed distances from appropriate reference points satisfy the equation $f(v, w) = 0$, in which $v$ and $w$ represent these directed distances, respectively, or if the stylus-supporting arms are otherwise forced to move, the curve traced out by the point of the stylus is a representation of whatever functional relation $f(v, w) = 0$ exists between the corresponding distances $v$ and $w$ in the particular case.

As previously indicated, two of the eight curve followers are connected by a movable link; these two, together with the movable link and an appropriate framework forming the double multiplier. This movable connection, or in other words, the double multiplier, may be described roughly as follows: The two curve followers of the double multiplier are held rigidly by a common framework in such a position that one of the stylus-supporting arms of one of the curve followers is parallel to one of the stylus-supporting arms of the other curve follower or in other words, such that each stylus-supporting arm of each curve follower is parallel to one of the stylus supporting arms of the other curve follower. Also, the framework of the double multiplier supports a movable link free to rotate through 360° about an axis through its midpoint perpendicular to its longitudinal centerline, the latter being always parallel to the parallel planes over which the two styli and the four stylus-supporting arms move. This movable link joins the two styli, each of these styli being free to move along the link in the direction of its longitudinal centerline.

As described above, the directed distances from appropriate reference points to the longitudinal centerlines of the two stylus-supporting arms of any curve follower may be represented by real variables. If the variables representing these distances in one of the curve followers of the double multiplier are $v$ and $w$ and if in the other curve follower of the double multiplier they are $z$ and $U$, such that $v$ and $z$, and so also $w$ and $U$, are associated with parallel stylus-supporting arms, then the movable link so constrains the movements of the four stylus-supporting arms that the variable $U$, $v$, $w$ and $z$ always satisfy the simultaneous equations $wz - Uv = 0$, $f_2(z, U) = 0$, and $f_3(v, w) = 0$, in which $f_2$ and $f_3$ are such that they may be represented by continuous plane curves or segments of such curves. Throughout this application a continuous segment of a plane curve is such that it may be represented by the track on a piece of paper or other suitable material made by a moving pencil or other appropriate means. In general, the two functions $f_2$ and $f_3$ are different. (It is because of the two products in the equation $wz-Uv=0$ that the double multiplier is so named.)

As previously indicated, the rigid connections between corresponding movable parts of two adjacent curve followers are of two distinct types; however, in general, any such rigid connection between two curve followers may be described as follows: The two curve followers are held rigidly by a common framework in such a position that each stylus-supporting arm of each curve follower is parallel to one of the stylus-supporting arms of the other curve follower. Also, two of the parallel stylus-supporting arms are rigidly connected to each other by rigid, movable, connecting rods, such that the directed distance from an appropriate reference point to the longitudinal centerline of one of the stylus-supporting arms so connected is always the same as the directed distance from a second reference point to the longitudinal centerline of the other member of the pair of rigidly connected stylus-supporting arms. These directed distances being the same, they may be represented by the same letter.

As described above, Unit I consists of the double multiplier and two additional curve followers. Each of the additional curve followers is rigidly connected to one of the two curve followers of the double multiplier and vice versa. The stylus-supporting arm associated with the variable U in the double multiplier is rigidly joined to a parallel stylus-supporting arm of one of the additional curve followers, so that this arm of the additional curve follower is also associated with the variable U. In the same way, the variable $w$ is associated with one of the stylus-supporting arms of the double multiplier and with one of the stylus-supporting arms of one of the additional curve followers. In the additional curve follower having a stylus-supporting arm associated with the variable U, the other stylus-supporting arm is associated with the variable $u$ and in the same way the stylus-supporting arm of the second additional curve follower not associated with $w$ is associated with W. Thus in Unit I, the five simultaneous equations listed in the following table always hold:

TABLE 1
*Unit I*

$f_1(u, U)=0$
$f_2(z, U)=0$
$f_3(v, w)=0$
$f_9(W, w)=0$, and
$g(U, v, w, z)=wz-Uv=0$ (Of these equations, the second, third, and fifth are associated with the double multiplier as previously indicated.)

As described above, Unit II consists of four rigidly connected curve followers. The rigid connections between these curve followers are such that one of the stylus-supporting arms of each of them may be associated with the same variable, namely V. Also, each of the remaining four stylus-supporting arms of Unit II is rigidly connected to one of those arms of Unit I associated with the variable $u$, $z$, $v$, and W, so that these variables also represent the directed distances from appropriate reference points to the longitudinal centerlines of four of the stylus-supporting arms of Unit II. That is, in Units I and II together, the following equations are satisfied simultaneously:

TABLE 2

| Unit I | Unit II |
|---|---|
| $f_1(u, U)=0$, | $f_4(u, V)=0$, |
| $f_2(z, U)=0$, | $f_5(z, V)=0$, |
| $f_3(v, w)=0$, | $f_6(v, V)=0$, |
| $f_9(W, w)=0$, | $f_{10}(W, V)=0$, and |
| $g(U, v, w, z)=wz-Uv=0$. | |

In this list each of the functions $f_i$ ($i=1, 2, 3, 4, 5, 6, 9, 10$) is such that it may be represented by some continuous segment of a plane curve. Each of the functions $f_i$ is associated with one of the curve followers of Units I or II.

Table 2 is a complete list of all the restrictions placed on the movements of any stylus-supporting arm of the function generator and control mechanism in its preferred embodiment. That is, the nine different equations of Table 2 must be always satisfied simultaneously. Also, the table indicates the rigid connections between the various stylus-supporting arms: Wherever a variable is repeated, in any of the functions $f_i(i=1, 2, 3, 4, 5, 6, 9, 10)$ the repetition indicates such a rigid connection. (That there are seven different variables indicates that there are, in the function generator and control mechanism, in its preferred embodiment, seven distinct, movable, rigid, pieces as previously mentioned herein.) The stylus-supporting arms associated with the variables $u$, $z$, $v$ and W are parallel to each other and perpendicular to the stylus-supporting arms associated with the variables U, V, and $w$. The two stylus-supporting arms associated with the variable $u$, together with the connecting rods joining these arms, form one of the seven movable rigid pieces previously mentioned; in the same way, the variables $v$, $w$ and $z$ are associated with such a rigid piece, the four pieces associated with the variables $u$, $v$, $w$ and $z$ being interchangeable. That is, the pieces associated with the variables $u$, $v$, $w$ and $z$ are of one kind—one of the three kinds previously mentioned in column 1 of this specification. Pieces of the second kind are associated with the variables U and $w$, the only piece of the third kind being associated with the variable V.

In a different embodiment of the function generator and control mechanism, also described in this paper, the connecting rods joining two rigidly connected stylus-supporting arms, as well as the movable link joining the two styli of the double multiplier, are detachable. In this second variation of the function generator and control mechanism, therefore, any or all of the restrictions imposed on the movements of the various stylus-supporting arms as indicated in Table 2 may be broken, at the same time introducing new variables. In this second variation of the function generator and control mechanism there are a maximum of sixteen different variables.

As previously indicated, the function generator and control mechanism may be used in a variety of ways. For example, it is possible to read from appropriate scales attached to parts of the double multiplier, corresponding values of $\phi$, $r$, $r \cos \phi$, $r \sin \phi$, $U=z \tan \phi$, and $z=U \cot \phi$, in which $\phi$, $r$, U, and $z$ are real variables. This example illustrates an exception to the rule that, in general, at least one of the functions $f_i$ of Table 2 must be specified, in order that the function generator and control mechanism shall be useful. This rule is illustrated by the following examples of the use of the instrument in the construction of a variety of precisely defined curves:

For example: if $f_1(u, U)=U-au-b=0,$
$f_3(v, w)=w-1=0,$
$f_4(u, V)=u-V=0,$
$f_6(v, V)=v-V=0,$ then $g(U, v, w, z)=wz-Uv=0$ becomes
$z=(aV+b)(V)=aV^2+bV,$ and the curve traced out by the stylus of that curve follower whose stylus-supporting arms are associated with the variables $z$ and V is a portion of the parabola $x=ay^2+by$ in which $a$ and $b$ are arbitrary real constants. It is possible in this manner to construct any desired portion of any parabola.

For example: if $$f_1(u, U) = U - u - c = 0,$$
$$f_3(v, w) = w - l - 0,$$
$$f_4(u, V) = u - aV^2 - bV = 0,$$
$$f_6(v, V) = v - V = 0,$$

then $wz - Uv = 0$ becomes
$z = (V)(aV^2 + c) = aV^3 + bV^2 + cV$ and the curve traced out by the stylus of that curve follower whose stylus-supporting arms are associated with $z$ and $V$ is defined by the cubic equation $$x = ay^3 + by^2 + cy,$$

in which $a$, $b$, and $c$ are arbitrary, real constants. In this manner, by using a previously constructed parabola to define a desired relation between the corresponding positions of two of the stylus-supporting arms, it is possible to construct any desired portion of the graph of any equation of the form $$x = \sum_{i=0}^{3} a_i y^i$$

in which the $a_i$ are real constants; and in a similar manner it is possible, by means of such a repetitive process, to construct any desired portion of the graph of the equation $$x = \sum_{i=0}^{n} a_i y^i$$

in which n is any positive integer greater than 1; or, more generally, to construct any desired portion of the graph of any equation of the form $$x = \left(\sum_{i=0}^{n} a_i y^i\right) \Big/ \left(\sum_{i=0}^{m} b_i y^i\right)$$

or, still more generally, to construct any desired portion of the curve defined by the parametric equations $$\begin{pmatrix} x = F_1(V) \\ y = F_2(V) \end{pmatrix}$$

in which $F_1(V)$ and $F_2(V)$ may be any rational functions of a single real variable $V$ for values of $V$ for which the functions $F_1$ and $F_2$ may be represented by continuous segments.

Also, the above examples illustrate the following statements: It is the primary contribution of the double multiplier to the working of the Function Generator and Control mechanism, in its preferred embodiment, to so constrain the movements of its stylus-supporting arms that their corresponding positions, given by the variables, $U$, $v$, $w$, and $z$, respectively, are always such that $wz - Uv = 0$. It is a second important contribution of the double multiplier in its preferred embodiment to make possible the substitution, in the equation $wz - Uv = 0$, of a function of $v$ for $w$, or of a function of $w$ for $v$, resulting for example, in the equation $wz - Uf_3(w) = 0$.

It is the primary purpose of each of the two curve followers which, together with the double multiplier, constitute Unit I, to make possible the substitution, in the equation $wz - Uv = 0$, of a function of a variable for a variable. For example, one of these additional curve followers makes possible the substitution of $f_1(u)$ for $U$, resulting in the equation $wz - vf_1(u) = 0$; the other additional curve follower makes possible the substitution of $f_9(W)$ for $w$, resulting in the equation $zf_9(W) - Uv = 0$. If both of these substitutions are made simultaneously, the following simultaneous equations, derived from the first, fourth, and fifth equations of Table I, are of immediate interest:

$$U = f_1(u)$$
$$w = f_9(W)$$
$$zf_9(W) - vf_1(u) = 0$$

If, also, the substitution of a function of $w$ for $v$ is made, as in the example of the preceding paragraph, the following simultaneous equations, derived from the first, third, fourth, and fifth equations of Table 1, are of immediate interest:

$$U = f_1(u)$$
$$v = f_3(w) = f_3[f_9(W)]$$
$$w = f_9(W)$$
$$zf_9(W) - f_1(u)f_3[f_9(W)] = 0$$

It is the primary purpose, in the same way, of each of the curve followers of Unit II to further interrelate the variables $u$, $z$, $v$, and $W$, by means of the relations between each of these variables and the variable $V$.

As indicated above, the various possibilities of substitution of one variable for another or of a function of the same or another variable for a variable, in the equation $wz - Uv = 0$, permit the construction of any of a very large class of precisely defined curves. Given such a curve, from whatever source, any curve follower may be used as a control mechanism to control other instruments. For example, if each of the stylus-supporting arms of any curve follower is rigidly connected to, say, a piston; that is, if one stylus-supporting arm is connected to one piston and the other stylus-supporting arm is connected to another piston; then the positions of the pistons, with respect to their housings, may be related by some equation $f(v, w) = 0$, if the equation of the curve over which the stylus of the curve follower is required to move is $f(x, y) = 0$, in which the point of the stylus always has the coordinate $(v, w)$. (In such a case, it may be necessary or desirable to interpose some variety of servo mechanism between the stylus-supporting arms and the pistons.)

Due to the interrelations between the stylus-supporting arms of the Function Generator and Control Mechanism, certain similar, though more complicated, controls are also possible. For example, if a piston is rigidly attached to each of the stylus-supporting arms of Unit II, and if the equations of the curves over which the styli of unit II move are those listed in the second column of Table 2, then the position of any one of the five pistons determines the positions of the other four; or in other words, one variable may be used in this way to control four others. Other similar possibilities will be described below.

These and other aspects of the invention will become more apparent from the detailed description which follows and from the accompanying drawings.

In the drawings,

FIGURE 1 is an oblique view, partly cut away and partly in section, of a generally typical curve follower;

FIGURE 2 is a plan view of a generally typical carriage by means of which the stylus-supporting arms of any of the curve followers are connected to the frame;

FIGURE 3 is an elevation of the carriage shown in FIGURE 2;

FIGURE 4 is an elevation of the carriage shown in FIGURES 2 and 3, taken at right angles to each of these figures;

FIGURE 5 is an oblique view of a generally typical double carriage, by means of which the various styli are supported by their respective stylus-supporting arms;

FIGURE 6 is an oblique view of the movable link and its associated framework, which, together with two curve followers, forms the double multiplier;

FIGURE 7 is an oblique view, partly cut away and partly in section, of one of the two essentially interchangeable carriages by means of which the two stylus-connecting arms of the movable link are connected to the framework of the movable link, showing also a cross section of that part of the frame to which the carriages are immediately connected;

FIGURE 8 is a plan view of the carriage also shown in FIGURE 7;

FIGURE 9 is a plan view of the double multiplier;

FIGURE 10 is an elevation of the double multiplier;

FIGURE 11 is an oblique view of the double multiplier, partly cut away and partly in section;

FIGURE 12 is an elevation of Unit I;

FIGURE 13 is an oblique view of Unit I, partly cut away and partly in section;

FIGURE 14 is an elevation of Units I and II together;

FIGURE 15 is an oblique view of Units I and II together, partly cut away and partly in section;

FIGURE 16 is an oblique view of two rigidly connected stylus-supporting arms, the rigid connection being of type 1;

FIGURE 17 is an oblique view of two rigidly connected stylus-supporting arms, the rigid connection being of type 2;

FIGURE 18 is an oblique view of four rigidly connected stylus-supporting arms, the rigid connection being of type 3;

FIGURE 19 is a plan view of the entire instrument;

FIGURE 20 shows the projections, on a single $xy$ plane parallel to the plane of the drawing of FIGURE 19, of the longitudinal centerlines of the stylus-supporting and stylus-connecting arms of the entire instrument, indicating also the relative positions of the various styli;

FIGURE 21 is an elevation of a part of the double multiplier in an alternative embodiment;

FIGURE 22 is an elevation of a part of Unit I in the alternative embodiment also partially depicted by FIGURE 21; and FIGURE 23 shows the projections, on a single $xy$ plane parallel to the plane of the drawing of FIGURE 9, of the longitudinal centerlines of the stylus-supporting and stylus-connecting arms of the double multiplier, indicating also the relative positions of the two styli of the double multiplier.

Each of the ten curve followers of the Function Generator and Control Mechanism is essentially interchangeable with the curve follower CF(3) shown in FIGURE 1. The mechanism of the curve follower is supported by the four straight, rigid, parallel, interchangeable, posts or pillars $P(i3)$, $1 \leqslant i \leqslant 4$, which stands on the corners of a square. (In this paper, unless otherwise specifically indicated, any symbol such as "$1 \leqslant i \leqslant 4$" will indicate that $i$ is an integer between 1 and 4, inclusive.) The straight, rigid, members $F(3v.i)$, $F(3w.i)$ and $F(3B.j)$, $1 \leqslant i \leqslant 2$, $1 \leqslant j \leqslant 4$, are rigidly attached to the pillars, perpendicular to the pillars, such that the parallel members $F(3v.i)$, $1 \leqslant i \leqslant 2$, lie on a plane perpendicular to the pillars, such that the parallel members $F(3w.i)$, $1 \leqslant i \leqslant 2$, perpendicular to $F(3v.i)$, $1 \leqslant i \leqslant 2$, lie on a second plane perpendicular to the pillars, and such that the members $F(3B.j)$, $1 \leqslant j \leqslant 4$, lie on a third plane perpendicular to the pillars $P(i.3)$, $1 \leqslant i \leqslant 4$. Aside from the fact that scales $SF(3v)$ and $SF(3w)$ are attached to $F(3v.1)$ and to $F(3w.1)$, respectively, $F(3v.1)$ and $F(3w.1)$ being interchangeable, each of the members $F(3v.i)$, $F(3w.i)$, and $F(3B.j)$ is interchangeable with each of the other members $F(3v.i)$, $F(3w.i)$, and $F(3B.j)$, $1 \leqslant i \leqslant 2$, $1 \leqslant j \leqslant 4$.

The members $F(3B.j)$, $1 \leqslant j \leqslant 4$, together support a detachable drawing board BD(3), the working face of BD(3) being parallel to and distinct from each of the three distinct planes determined by the members $F(3v.i)$, $F(3w.i)$, and $F(3B.j)$, $1 \leqslant i \leqslant 2$, $1 \leqslant j \leqslant 4$. The working face of the board BD(3) is a square, parallel to and congruent with the square on which the pillars $P(i.3)$, $1 \leqslant i \leqslant 4$, stand, except for notches N(1) and N(2) cut out of two adjacent corners of the board BD(3), and except for similar notches cut out from the remaining corners, these latter notches permitting the board BD(3) to fit snugly between two of the adjacent pillars, as between P(3.3) and P(4.3) in FIGURE 1. The dimensions of the notches N.(1) and N(2) are such that the board BD(3) may be moved toward N(1) and N(2), away from the opposite pillars, a distance equal to the width of any of the pillars, and such that, in this forward position, BD(3) may be tipped and so detached from the curve follower through the opening between F(3v.1) and F(3B.1), between P(1.3) and P(2.3). (While removing or inserting the board BD(3) the stylus S(3) would be positioned in one of the corners, adjacent to P(4.3) or P(3.3).) Wedges or inserts, not shown, may be provided to keep the board firmly in position as shown in the drawing, whenever it is in use; the wedges just fitting between the pillars P(1.3) and P(2.3) and the board, in the notches N(1) and N(2). (In FIGURE 1, BD(3) is shown cut away, to permit a view of its supporting members F(3B.3) and F(3B.4).)

The four scales $SB(3.i)$, $1 \leqslant i \leqslant 4$, on the working face of BD(3) near each of the outer edges of BD(3), are interchangeable with each other. The zero of each scale is at its midpoint, marked "0" or by an arrow or in some other appropriate manner. Each scale extends the entire distance along the edge of the board between adjacent pillars, in both directions from its center. Each scale is parallel to the edge of the board along which it lies. The unit distance may be any convenient distance, say one inch or one centimeter. The scale need appear on any scale, other than "0" or some other indication of the center of the scale.

Each of the members $F(3v.i)$, $F(3w.i)$, $1 \leqslant i \leqslant 2$, supports a movable carriage: $TF(3v.1)$ on $F(v3.1)$, $TF(3v.2)$, on $F(3v.2)$, $TF(3w.1)$ on $F(3w.1)$, and $TF(3w.2)$ on $F(3w.2)$. The carriages $TF(3v.1)$ and $TF(3w.1)$ are interchangeable. $TF(3v.1)$, as shown in FIGURES 2, 3, and 4, is essentially a rigid housing for four sets of rollers or bearings $R(i)$, $1 \leqslant i \leqslant 4$. As shown in FIGURE 3, the clear space between these bearings is just sufficient to admit the member $F(3v.1)$, so that in place on $F(3v.1)$, $TF(3v.1)$ may move freely in the direction of the longitudinal centerline of $F(3v.1)$, and essentially in no other direction. As many individual bearings or rollers may be included in each of the four sets $R(i)$, $1 \leqslant i \leqslant 4$, as may be necessary to constrain the motion of $TF(3v.1)$ in this manner.

The stylus-supporting arm $A(3v)$ is a rigid, straight, member rigidly attached to both $TF(3v.1)$ and to $TF(3v.2)$ in such a way as to be perpendicular to $F(3v.1)$. A scale $SF(3v)$ is attached to $F(3v.1)$, as previously mentioned. $SF(3v)$ is interchangeable with each of the scales $SB(3.i)$ $1 \leqslant i \leqslant 4$, except that the zero of the scale $SF(3v)$ is offset from the center of $F(3v.1)$ a distance such that, when the indicator wire $IW(v)$ attached to $TF(3v.1)$ is immediately over the zero of the scale $SF(3v)$, the longitudinal centerline of $A(3v)$ is directly above the midpoint of $F(3v.1)$. In other words, when the number on the scale $SF(3v)$ under $IW(v)$ is zero, a line perpendicular to the working face of BD(3) through the zero of the scale $SB(3.4)$ intersects the longitudinal centerline of $A(3v)$ at right angles. In the same way, the scale $SF(3w)$ is attached to $F(3w.1)$, $SF(3w)$ being interchangeable with $SF(3v)$. $TF(3v.2)$ and $TF(3w.2)$ are interchangeable, and each is interchangeable with $TF(3v.1)$, except that neither $TF(3v.2)$ nor $TF(3w.2)$ carries an indicator wire such as $IW(v)$ attached to $TF(3v.1)$ or $IW(w)$ attached to $TF(3w.1)$. $TF(3v.1)$ and $TF(3w.1)$ are interchangeable, as indicated above. Thus $A(3v)$, together with the carriages $TF(3v.1)$ and $TF(3v.2)$ to which it ($A(3v)$) is rigidly attached, may move freely from a position close to $F(3w.1)$ to a position close to $F(3w.2)$, $A(3v)$ being always parallel to $F(3w.1)$ and always on a plane parallel to the working face of BD(3). In the same way, $A(3w)$, interchangeable with $A(3v)$, is attached, rigidly, to both $TF(3w.1)$ and to $TF(3w.2)$ such that $A(3w)$ is perpendicular to $F(3w.1)$, and such that, when the indicator wire $IW(w)$ is over the zero of the scale $SF(3w)$ the longitudinal centerline of $A(3w)$ is directly over the midpoint of $F(3w.1)$. Thus $A(3w)$, together with $TF(3w.1)$ and $TF(3w.2)$, may move freely from a position close to F(3v.1) to a position close to F(3v.2), A(3w) being always perpendicular to A(3v) and always on a plane parallel to the working face of BD(3), the planes on which A(3v) and A(3w) move being distinct from each other and from the plane of the working face of BD(3).

The double carriage TA(3v)—TA(3w), jointly supported by the stylus-supporting arms A(3v) and A(3w), consists of the two carriages TA(3v) and TA(3w), each being essentially interchangeable with TF(3v.1), fastened rigidly to each other at right angles, as shown in FIGURE 5, by means of straps, or by means of rivets or bolts between their adjacent faces, or in any other appropriate manner. Neither TA(3v) nor TA(3w) is equipped with an indicator wire such as IW(v) on TF(3v.1). Also, the stylus-extension SE(3) is attached rigidly to one face of TA(3v), SE(3) being a rigid cylindrical pin, and the stylus S(3) is attached rigidly to the opposite face of TA(3w), in such a way that the longitudinal centerlines of S(3) and SE(3) are colinear, and such that, in place in the curve follower, this common longitudinal centerline of S(3) and SE(3) intersects both the longitudinal centerline of A(3v) and the longitudinal centerline of A(3w) at right angles to these lines. Except for S(3), SE(3), and the absence of indicator wires, TA(3v) and TA(3w) are each interchangeable with TF(3v.1).

Thus A(3v) may move freely between a position close to F(3w.1) in which TA(3w) touches TF(3w.1) and a position close to F(3w.2) in which TA(3w) touches TF(3w.2); and in the same way A(3w) may move freely between a position close to F(3v.1) in which TA(3v) touches TF(3v.1) and a position close to F(3v.2) in which TA(3v) touches TF(3v.2). If A(3w) is held in any of its possible positions and prevented from moving while at the same time A(3v) is forced to move, then the point of the stylus S(3) is constrained to move along the straight line which is the projection of the longitudinal centerline of A(3w) on the working face of BD(3), for example the dotted line $y=w$ of FIGURE 1. In the same way, if A(3v) is held fast while A(3w) moves, then the point of the stylus S(3) is constrained to move along the straight line which is the projection of the longitudinal centerline of A(3v) on the working face of the board BD(3), for example the dotted line $x=v$ of FIGURE 1, the length of S(3) being such as to extend from the face of TA(3w) to the board BD(3). If A(3v) and A(3w) are moved simultaneously, then the point of the stylus S(3) moves over a continuous segment of some plane curve, as for example the curve $f_3(x, y)=0$, shown in FIGURE 1. Whenever, in a particular case, it may be desired that S(3) shall move along some particular straight line, the guide bar GB(3) may be usefully employed. GB(3) is a rigid, U-shaped member of such a length that it will fit between diagonally opposite pillars, as P(1.3) and P(3.3), on the surface of the board BD(3). In use, the legs of the U of GB(3) would be positioned astride the stylus S(3), then GB(3) would be clamped in the desired position by clamps Cl(1) and Cl(2), thus preventing any movement of S(3) except the desired movement along the straight line. Clamps similar to Cl(1) and Cl(2), such as Cl(3), may be used to prevent the movement of either or both of the stylus-supporting arms A(3v) and A(3w), four such clamps being ordinarily used to hold either A(3v) or A(3w) in a desired position. When not in use, all clamps and the guide bar GB(3) would be removed from the curve follower.

Ordinarily, when in use, a sheet of paper or other suitable material would be attached to the working face of BD(3), directly beneath the point of the stylus S(3). No marks need appear on the face of the drawing board, which should be smooth, except for the four scales near its edges. The marks on the paper would normally include the axes, generally drawn on the paper before placing it on the drawing board, typical, convenient, axes being indicated in FIGURE 1; and in addition to the axes the marks on the paper would normally include the curve over which the point of the stylus moves. If the curve is drawn on the paper before being inserted in the curve follower, the intention of the operator would be to constrain the movements of the stylus-supporting arms in some way, by forcing the point of the stylus to follow the curve. If the curve is drawn on the paper by the stylus of the curve follower, the curve constitutes a permanent record of the corresponding positions of the stylus-supporting arms. The dotted lines $x=v$ and $y=w$ shown in FIGURE 1 are for the convenience of this description only; neither of these lines would normally appear on the paper.

In this paper the real variable $v$ represents the directed distance of the longitudinal centerline of the stylus-supporting arm A(3v) from its neutral position, that is, from a position such that a line perpendicular to BD(3) through the midpoint of F(3v.1) intersects the longitudinal centerline of A(3v). In any particular position of A(3v), the value of $v$ is the number on the scale SF(3v) under IW(v); when A(3v) is in its neutral position this number is zero. In the same way, $w$ represents the directed distance of A(3w) from its neutral position; in any particular position of A(3w) the value of $w$ is the number on the scale SF(3w) under IW(w); when A(3w) is in its neutral position this number is zero. It is convenient to choose rectangular Cartesian axes, for reference purposes, such that the $x$-axis joins the zeros of the scales SB(3.1) and SB(3.3), and such that the $y$-axis joins the zeros of the scales SB(3.2) and SB(3.4). In other words, the origin is the point of intersection of a line perpendicular to the face of BD(3) through the intersection of the diagonals of the square on which the pillars P(i.3), $1 \leq i \leq 4$, stand, with the working face of BD(3). (When both A(3v) and A(3w) are in their neutral positions, the line perpendicular to BD(3) through the intersection of the diagonals of the square on which the pillars stand is colinear with the longitudinal centerlines of S(3) and SE(3).) The $x$-axis is a line through the origin parallel to the longitudinal centerline of A(3w), whatever the position of A(3w); and in the same way the $y$-axis is a line through the origin parallel to the longitudinal centerline of A(3v). With axes chosen in this manner, the directed distance from the $y$-axis to the point of the stylus S(3) is always the same as the directed distance of the longitudinal centerline of A(3v) from its neutral position, this distance being indicated by the number on the scale SF(3v) under the hairline IW(v) and represented in this paper by the real variable $v$, that is, the axes were so chosen as to make $v$ the $x$ coordinate of the point of the stylus S(3). In the same way, the directed distance from the $x$-axis to the point of the stylus S(3), is always the same as the directed distance from its neutral position to the longitudinal centerline of A(3w), this distance being indicated by the number on the scale SF(3w) under the hairline IW(w) and represented in this paper by the real variable $w$. That is, the axes were so chosen as to make the $y$ coordinate of the point of the stylus S(3) equal to $w$. Thus, for any position of the stylus S(3), the coordinates of the point of the stylus may be read off from the scales SF(3v) and SF(3w), these coordinates being in general, $(v, w)$. The imaginary lines $x=v$ and $y=w$ shown in FIGURE 1 intersect at right angles at the point of the stylus, the line $x=v$ being the projection on the working face of BD(3) of the longitudinal centerline of A(3v), and in the same way the line $y=w$ being the projection on the working face of BD(3) of the longitudinal centerline of A(3w).

When the point of the stylus S(3) moves over some curve $f_3(x, y)=0$, since the lines $x=v$ and $y=w$ intersect on the curve, $f_3(v, w)=0$, and the stylus-supporting arms A(3v) and A(3w) are constrained to move so that their corresponding positions, with respect to their neutral positions, satisfy the question $f_3(v, w)=0$. In the same way, if the stylus-supporting arms are moved, their corresponding positions, with respect to their neutral positions, do satisfy some equation $f_3(v, w)=0$, and the stylus is constrained to move over a curve defined by the equation $f_3(x, y)=0$, this curve constituting a permanent record of the corresponding positions of the stylus-supporting arms A(3v) and A(3w).

Having described a single, typical, curve follower, the immediately following paragraphs describe the movable link ML(1), which, connected between two curve followers, forms the double multiplier. As shown in FIGURE 6, the mechanism of the movable link is supported by the four interchangeable, straight, rigid, parallel, pillars P(i.L), $1 \leqslant i \leqslant 4$, which stand on the corners of a square congruent with the square on which the pillars P(i.3), $1 \leqslant i \leqslant 4$, stand. Each of the pillars P(i.L), $1 \leqslant i \leqslant 4$, is rigidly attached at right angles to the rigid circular track FL(1), shown in cross section in FIGURES 7 and 11. At its outer edge FL(1) is a flat circular cylinder. At its inner edge, as shown in FIGURE 7, FL(1) is shaped to fit against the bearings or rollers R(5) and R(6). Each bearing in each of the two sets R(5) is the frustum of a rigid right circular cone mounted on an axle perpendicular to the base through the center of the base. Each of the rollers or bearings R(6) is a rigid cylinder similar to the bearings in the sets R(i), $1 \leqslant i \leqslant 4$.

The track FL(1) supports the two movable carriages TL(1) and TL(2), TL(1) being shown in FIGURES 7 and 8. TL(1) is essentially a rigid housing for the two sets of bearings R(5) and R(6). In place on the track FL(1), TL(1) may move freely around the track, without appreciable slipping or wobble. TL(1) and TL(2) are interchangeable except for the index line IL($\phi$) attached to TL(1).

The straight, rigid, stylus-connecting arm LA(1) is attached rigidly to both TL(1) and to TL(2), in such a position that the line L(1) through the mid-point of the longitudinal centerline of LA(1), perpendicular to the longitudinal centerline of LA(1) and parallel to the longitudinal centerlines of each of the pillars P(i.L), $1 \leqslant i \leqslant 4$, passes through the point of intersection of the diagonals of the square on which the pillars P(i.L), $1 \leqslant i \leqslant 4$, stand. In a plan view, in other words, the longitudinal centerline of LA(1) passes through the center of the three concentric circles which, in a plan view, represent FL(1)—see FIGURE 9. In the same way, the stylus-connecting arm LA(2), interchangeable with LA(1), is attached rigidly to both TL(1) and to TL(2), so that the rigidly connected members TL(1), TL(2), LA(1), and LA(2) may rotate, freely, through 360° around the track FL(1), this movement being essentially the only movement possible for these parts. The axis of rotation of LA(1)—LA(2) is the line L(1) parallel to the centerlines of each of the pillars P(i.L), $1 \leqslant i \leqslant 4$, through the point of intersection of the diagonals of the square on which the pillars P(i.L), $1 \leqslant i \leqslant 4$, stand, this line intersecting the longitudinal centerlines of LA(1) and LA(2) at right angles at the midpoints of LA(1) and LA(2). The longitudinal centerlines of LA(1) and LA(2) are parallel and determine a plane which includes as one of its lines the axis of rotation of LA(1) and LA(2), this plane also including as one of its lines the index line IL($\phi$) attached to TL(1).

Attached to LA(1) and to LA(2) are the interchangeable scales SLA(1) and SLA(2), respectively. Except for their lengths these scales are interchangeable with SF(3v). The zero of each of the scales SLA(1) and SLA(2) is offset from the midpoints of LA(1) and LA(2), respectively, the same distance, and for the same reason, as the zero of the scale SF(3v) is offset from the midpoint of F(3v.1); each of the scales SLA(1) and SLA(2) extends the entire distance from its zero point in both directions to the carriages TL(1) and TL(2). Except for its length and the presence of the scale SLA(1), LA(1) is interchangeable with A(3v).

Each of the stylus-connecting arms LA(1) and LA(2) supports a movable carriage, TLA(1) on LA(1) and TLA(2) on LA(2), TLA(1) being interchangeable with TLA(2). The stylus-extension-cylinder SEC(2) is rigidly attached to TLA(1), SEC(2) being a rigid, hollow, cylinder. SEC(3), interchangeable with SEC(2), is rigidly attached to TLA(2). The inside diameter of SEC(3) is just sufficient to admit the member SE(3), so that, in place in the double multiplier, SE(3) may rotate freely inside SEC(3), this rotation being essentially the only relative movement possible between SE(3) and SEC(3). The longitudinal centerlines of SEC(2) and SEC(3) are parallel to the longitudinal centerlines of the pillars P(i.L), $1 \leqslant i \leqslant 4$, the longitudinal centerlines of SEC(2) and SEC(3) being lines in the plane determined by the parallel longitudinal centerlines of LA(1) and LA(2). Except for SEC(2), TLA(1) is interchangeable with TF(3v.1). Thus TLA(1) and TLA(2) may move freely along LA(1) and LA(2), respectively, in the direction of the longitudinal centerlines of LA(1) and LA(2), this movement lengthwise along LA(1) and LA(2) being essentially the only possible movement, relative to LA(1) and LA(2), for TLA(1) and TLA(2), respectively. It is the parts TL(1), TL(2), LA(1), LA(2), TLA(1), TLA(2), SEC(2), SEC(3) which, collectively, are designated by the term "movable link" ML(1). In its neutral position the longitudinal centerline of SEC(2) coincides with the axis of rotation of LA(1), and the number on the scale SLA(1) under the indicator wire IW(r) attached to TLA(1) is zero. In this paper the real variable r represents the distance measured along the longitudinal centerline of LA(1) from its neutral position through which the longitudinal centerline of SEC(2) has moved. In any particular position of TLA(1) the value of r is the number on the scale SLA(1) under the hair line IW(r). In the same way, when TLA(2) is in its neutral position the longitudinal centerline of SEC(3) is colinear with the axis of rotation of LA(1)—LA(2) and the number on the scale SLA(2) under the hairline IW(R) is zero. In this paper the real variable R represents the distance, measured along the longitudinal centerline of LA(2), from its neutral position through which the longitudinal centerline of SEC(3) has moved; in any particular position of SEC(3), the value of R is the number on the scale SLA(2) under the indicator wire IW(R) attached to TLA(2). When both SEC(2) and SEC(3) are in their neutral positions, the longitudinal centerlines of SEC(2) and SEC(3) are colinear with each other and with the axis of rotation of LA(1)—LA(2). [IW(r) and IW(R) are not shown in the drawings.]

A scale SL(1), in degrees or other angular measure from 0° to 360°, is attached to FL(1), the zero of the scale SL(1) being halfway between the pillars P(2.L) and P(3.L), 90° being halfway between P(3.L) and P(4.L). In its neutral position LA(1)—LA(2) is parallel to two of the sides of the square on which P(i.L), $1 \leqslant i \leqslant 4$, stand, specifically to the side on which the pillars P(1.L) and P(2.L) stand, and to the side on which P(3.L) and P(4.L) stand. Further, when LA(1)—LA(2) is in its neutral position, TL(1) is between P(2.L) and P(3.L), and the number on the scale SL(1) under the index line IL($\phi$) is zero. In this paper the real variable $\phi$ represents the angle through which LA(1)—LA(2) has turned from its neutral position. For any particular position of LA(1)—LA(2), the value of $\phi$ is the number on the scale SL(1) under the index line IL($\phi$) attached to TL(1).

Whenever desired, the stylus-connecting arms LA(1) and LA(2) may be held in any specified position and prevented from moving by means of clamps similar to Cl(1), four such clamps being normally used for this purpose, these clamps not being shown in the drawings. Also, in the same way, either TLA(1) or TLA(2), or both, may be stopped in any desired position and prevented from moving along LA(1) or LA(2), by means of clamps similar to Cl(1).

As previously indicated, the double multiplier, shown in FIGURES 9, 10, and 11, consists of two curve followers connected to each other by the movable link just described. One of the two curve followers of the double multiplier, namely CF(3), was previously described in detail. The second curve follower of the double multiplier, namely CF(2), is interchangeable with CF(3), with the following exceptions: CF(2) lacks a stylus such as S(3), a drawing board such as BD(3), supports such as F(3B.$i$), $1 \leqslant i \leqslant 4$, for a drawing board, and a guide bar such as GB(3). Also, the stylus-supporting arm A(2$z$), corresponding in CF(2) to A(3$v$) in CF(3), is positioned below, rather than above, the stylus supporting arm A(2U), corresponding in CF(2) to A(3$w$) in CF(3), A(3$v$) being positioned above A(3$w$). Finally, the stylus-extension SE(2), corresponding in CF(2) to SE(3) in CF(3), is rigidly attached to the bottom rather than the top of TA(2$z$), which corresponds, in CF(2), with TA(3$v$) in CF(3). (Previous references, in this paper, to the stylus of CF(2) should be understood, specifically, as references to SE(2).)

The three major components of the double multiplier, namely CF(2), CF(3) and ML(1) are rigidly connected to each other by means of rigid connections between the pillars P($i$.2), P($i$.L) and P($i$.3), $1 \leqslant i \leqslant 4$: the mechanism of the double multiplier is supported by the four interchangeable, straight, rigid, parallel pillars P($i$.$m$), $1 \leqslant i \leqslant 4$, which stand on the corners of the square on which the pillars P($i$.3), $1 \leqslant i \leqslant 4$, stand. That is, the pillars P(1.2), P(1.L), and P(1.3) are rigidly connected to each other to form the single pillar P(1.$m$). In the same way, P(2.$m$) is composed of P(2.2), P(2.L), and P(2.3); P(3.$m$) is composed of P(3.2), P(3.L), and P(3.3); and P(4.$m$) is composed of P(4.2), P(4.L), and P(4.3). Also, the stylus-extension SE(3) is fitted into the stylus-extension-cylinder SEC(3), and in the same way SE(2) is fitted into SEC(2) such that the longitudinal centerlines of SE(2) and SEC(2) are colinear, as are the longitudinal centerlines of SEC(3), SE(3) and S(3). These are the only direct physical connections between the three major parts of the double multiplier.

In the same way that the real variable $v$ represents the directed distance through which the longitudinal centerline of A(3$v$) has moved from its neutral position, so the real variables U and $z$ represent the directed distances from their neutral positions of the longitudinal centerlines of A(2U) and A(2$z$), respectively; the neutral positions of A(2U) and A(2$z$) being defined in the same manner as the neutral positions of A(3$v$) and A(3$w$). For any particular position of A(2U), the value of U is the number on the scale SF(2U) under the hairline IW(U) attached to TF(2U.1); in the same way, for any particular position of A(2$z$), the value of $z$ is the number on the scale SF(2$z$), under IW($z$) attached to TF(2$z$.1). The scales SF(2U) and SF(2$z$), and the indicator wires IW(U) and IW($z$) are not shown in the drawings; they are interchangeable with the corresponding parts SF(3$w$), SF(3$v$), IW($w$), and IW($v$) shown in FIGURE 1. With rectangular Cartesian axes chosen as before on the plane of the drawing board BD(3), or on any parallel plane, the longitudinal centerlines of A(2$z$) and A(3$v$) are parallel to the $y$-axis, and the longitudinal centerlines of A(2U) and A(3$w$) are parallel to the $x$-axis, however the stylus-supporting arms may move. The projection on the $xy$ plane of the longitudinal centerline of A(2$z$) is a line parallel to the $y$-axis at a directed distance from the $y$-axis equal to the directed distance through which the longitudinal centerline of A(2$z$) has moved from its neutral position; therefore the projection on the $xy$ plane of the longitudinal centerline of A(2$z$) may be defined by the equation $x=z$, $z$ representing the directed distance through which the longitudinal centerline of A(2$z$) has moved from its neutral position. In the same way, the projections on the $xy$ plane of the longitudinal centerlines of A(2U), A(3$v$), and A(3$w$) may be defined by the equations $y=U$, $x=v$, and $y=w$, respectively. The longitudinal centerline of SE(2) intersects the $xy$ plane at the point of intersection of the lines $x=z$, $y=U$, that is, at the point ($z$, U); and the longitudinal centerline of S(3) intersects the $xy$ plane at the point of intersection of the lines $x=v$, $y=w$, or in other words at the point ($v$, $w$).

Since the axis of rotation of the movable link ML(1) is a line parallel to the longitudinal centerline of any of the pillars P($i$.L), $1 \leqslant i \leqslant 4$, through the intersection of the diagonals of the square on which the pillars P($i$.L), $1 \leqslant i \leqslant 4$, stand, the axis of rotation of the movable link ML(1) intersects the $xy$ plane at right angles at the origin. Therefore, the projection on the $xy$ plane of the longitudinal centerline of LA(1) is a line through the origin. Since the longitudinal centerlines of LA(1) and LA(2) are coplanar with the axis of rotation of ML(1), the projections on the $xy$ plane of LA(1) and LA(2) are colinear. Since the longitudinal centerline of SEC(2) is also a line in the plane determined by the longitudinal centerlines of LA(1) and LA(2), and since the longitudinal centerlines of SEC(2) and SE(2) are colinear, the longitudinal centerline of SE(2) intersects the $xy$ plane at right angles at a point on the projection on the $xy$ plane of the longitudinal centerline of LA(1). Since the coordinates of the point of intersection of the longitudinal centerline of SE(2) with the $xy$ plane are ($z$, U), the point ($z$, U) is a point on the projection on the $xy$ plane of the longitudinal centerline of LA(1). Thus the projection on the $xy$ plane of the longitudinal centerline of LA(1) may be defined by the equation $y=(U/z)x$. In the same way, the longitudinal centerline of S(3) intersects the $xy$ plane at the point ($v$, $w$), this point being a point on the projection on the $xy$ plane of the longitudinal centerline of LA(2); so therefore the projection on the $xy$ plane of the longitudinal centerline of LA(2) may be defined by the equation $y=(w/v)x$. Since the lines $y=(U/z)x$ and $y=(w/v)x$ are colinear, $U/z=w/v$, or $wz-Uv=0$. The projections on the $xy$ plane of the longitudinal centerlines of A(2$z$), A(2U), A(3$v$), and A(3$w$), and of LA(1)—LA(2) are shown in FIGURE 23. Also, the angle $\phi$, shown in FIGURE 23, between the lines $y=(U/z)x=(w/v)x$ and the $x$-axis is the same as the angle through which the movable link ML(1) has moved from its neutral position. The points ($z$, U) and ($v$, $w$) shown in FIGURE 23 indicate the relative positions of the stylus-extension SE(2) and the stylus S(3), respectively, the point ($z$, U) being the point of intersection of the longitudinal centerline of SE(2) with the $xy$ plane, and the point ($v$, $w$) being the point of intersection of the longitudinal centerline of S(3) with the $xy$ plane. Thus the movements of the movable link ML(1), the stylus-extension SE(2), the stylus S(3), and the four stylus-supporting arms A(2$z$), A(2U), A(3$v$) and A(3$w$) are constrained such that the corresponding, simultaneous, positions of these parts of the double multiplier may be described, in relation to conveniently chosen $x$ and $y$ axes, as follows: the projections of the longitudinal centerlines of A(3$v$), A(3$w$), A(2$z$), A(2U) and LA(1)—LA(2) on the $xy$ plane, may be defined by the equations $x=v$, $y=w$, $x=z$, $y=U$ and
$$y=(U/z)x=(w/v)x$$
respectively; the point ($z$, U) being the point of intersection of the longitudinal centerline of SE(2) with the $xy$ plane, and the point ($v$, $w$) being the point of intersection of the longitudinal centerline of S(3) with the $xy$ plane. Or, more simply, without reference to an $xy$ plane, the movements of the four stylus-supporting arms are so constrained that their corresponding positions, indicated by the real variables U, $v$, $w$, and $z$, are related by the equation $wz-Uv=0$, the longitudinal centerline of SE(2) intersecting both the longitudinal centerlines of A(2$z$) and A(2U) at right angles, the longitudinal centerline of S(3) intersecting both the longitudinal centerlines of A(3$v$) and A(3$w$) at right angles, the longitudinal centerlines of SE(2) and S(3) being always parallel to the axis of rotation of LA(1)—LA(2), these three lines being always coplanar, the plane determined by the axis of rotation of LA(1)—LA(2), together with the longitudinal centerlines of SE(2) and S(3), being free to rotate through 360°. Or, if A and B are complex numbers such that $A=z+iU$ and $B=v+iw$, in which $i$ is the imaginary unit, U, $v$, $w$, and $z$ being real variables defined as before, the mechanism of the double multiplier constrains the movements of the stylus-supporting arms such that $Im(A\overline{B})=Uv-wz=0$.

Whenever either or both A(3v) and A(3w) move, the stylus S(3) moves; and in the same way, whenever either or both A(2z) and A(2U) move, the stylus-extension SE(2) moves. Whenever S(3) moves in such a way that the path of the point of intersection with the $xy$ plane of the longitudinal centerline of S(3) is not a straight line through the origin, then ML(1) moves; and in the same way, whenever SE(2) moves in such a way that the path of the point of intersection of the longitudinal centerline of SE(2) with the $xy$ plane is not a straight line through the origin, then also ML(1) moves. Also, whenever S(3) moves, either or both A(3v) and A(3w) move, depending on the path of the point of intersection of the longitudinal centerline of S(3) with the $xy$ plane: If this path is parallel to the $x$-axis, then A(3w) does not move; if the path is parallel to the $y$-axis, then A(3v) does not move; if the path is not parallel to either axis, then both A(3v) and A(3w) move, as well as ML(1), unless the path is a straight line through the origin. In the same way, whenever SE(2) moves, if the path of the point of intersection of the longitudinal centerline of SE(2) with the $xy$ plane is parallel to the $x$-axis, then A(2U) does not move, if the path is parallel to the $y$-axis, then A(2z) does not move; if the path is not parallel to either axis and is not a straight line through the origin, then A(2z), A(2U), and ML(1) all move. Whenever ML(1) moves, then either the longitudinal centerline of SE(2) is colinear with the axis of rotation of ML(1) and both A(2U) and A(2z) are in their neutral positions, or also SE(2) moves; in the same way, whenever ML(1) moves, if A(3v) and A(3w) are not both in their neutral positions, in which case the longitudinal centerline of S(3) is colinear with the axis of rotation of ML(1), then S(3) moves. If the four stylus-supporting arms are all in their neutral positions, so that the longitudinal centerlines of SE(2) and S(3) are both colinear with the axis of rotation of ML(1), then ML(1) may spin freely through 360° without at the same time causing any other part to move.

Whenever S(3) moves, it moves over some path which may be defined by an equation of the form $f_3(x, y)=0$; that is, the path of the point of intersection of the longitudinal centerline of S(3) with the $xy$ plane may be defined by an equation $f_3(x, y)=0$. Since the point $(v, w)$ is always a point on the path of the point of intersection of the longitudinal centerline of S(3) with the $xy$ plane, the relation between the corresponding, simultaneous, positions of the stylus-supporting arms A(3v) and A(3w) may be expressed by the equation $f_3(v, w)=0$, whenever the equation of the path of the point of intersection of the longitudinal centerline of S(3) with the $xy$ plane is defined by the equation $f_3(x, y)=0$. In the same way, whenever SE(2) moves, the point of intersection of the longitudinal centerline of SE(2) with the $xy$ plane moves over some path $f_2(x, y)=0$, and since the point $(z, U)$ is always a point on this path, the relation between the corresponding positions of the stylus-supporting arms A(2z) and A(2U) may be expressed by the equation $f_2(z, U)=0$. Therefore the corresponding positions of the four stylus-supporting arms of the double multiplier are always such that the equation $$g(U, v, w, z)=wz-Uv=0$$

holds, and such that the equations $f_2(z, U)=0$ and $f_3(v, w)=0$ hold whenever the paths of the points of intersection of the longitudinal centerlines of SE(2) and S(3) with the $xy$ plane are defined by the equations $f_2(x, y)=0$ and $f_3(x, y)=0$, respectively.

Having thus described the double multiplier, it is possible to indicate a variety of similar ways in which it may be used: Since the equation $wz-Uv=0$ holds, and since corresponding values of the variables U, $v$, $w$, and $z$ may be read off from the scales SF(2U), SF(3v), SF(3w), and SF(2z), under the indicator wires IW(U), IW(v), IW(w), and IW(z), respectively, the double multiplier constitutes a means for solving the equation $wz-Uv=0$, mechanically, for any of the variables U, $v$, $w$, and $z$, given the remaining three of these variables. If a curve $y=f_3(x)$, for example, drawn on a sheet of paper, is available, this paper may be placed on the board BD(3), the axes of the graph being colinear with (imaginary) lines joining the zeros of the scales SB(3.1)—SB(3.3) and SB(3.2)—SB(3.4), so that the point of the stylus may be forced to follow the curve $y=f_3(x)$, thus forcing the stylus-supporting arms A(3v) and A(3w) to move so that their corresponding positions are related by the equation $w=f_3(v)$. Since $wz-Uv=0$, always, and in this case $w=f_3(v)$, in this case $zf_3(v)-Uv=0$. This equation may be solved, say for $v$, given $z$ and U, by reading the value of $v$ corresponding to the given values of $z$ and U from the scale SF(3v) under the hairline IW(v), the values of $z$ and U being the numbers on the scales SF(2z) and SF(2U) under the indicator wires IW(z) and IW(U), respectively. Simultaneously, in this case, the value of $f_3(v)$ may be read from the scale SF(3w) under the indicator wire IW(w). (In this example, it is assumed that the curve $y=f_3(x)$ is continuous, or at least has a continuous branch, and that the given values of $z$ and U are such that there exists a real corresponding value of $v$.)

It is possible to use the double multiplier to solve a variety of other equations, mechanically. For example, the relations $U=r \sin \phi$, $z=r \cos \phi$, $w=R \sin \phi$, $v=R \cos \phi$, $U=z \tan \phi$, $v=w \cot \phi$, $\phi=\arc \sin (U/r)$, $r=\sqrt{U^2+z^2}$, $R=\sqrt{v^2+w^2}$, etc. all hold, as may be seen from an inspection of FIGURE 23. Any of these equations may be solved by the double multiplier.

Other relations between the real variables, U, $u$, $v$, V, $w$, W, $z$, $r$, R, and $\phi$ and between these and certain other variables, may be established, mechanically, by means of the remaining curve followers of the function generator and control mechanism. The immediately following paragraphs describe Unit I, which consists of the double multiplier just described plus two additional curve followers.

Each of the additional curve followers, namely CF(1) and CF(9), of Unit I, shown in FIGURES 12, 13 and 19 is essentially interchangeable with CF(3). CF(1) and CF(9) each lack a stylus-extension such as SE(3). The member F(1U.1), corresponding in CF(1) with the member F(3w.1) in CF(3), is not equipped with a scale such as SF(3w); and there is no indicator wire attached to TF(1U.1) which corresponds with IW(w) attached to TF(3w.1). With these exceptions CF(1) and CF(3) are interchangeable. CF(9) is interchangeable with CF(1), except that the stylus-supporting arm A(9w) corresponding, in CF(9), with A(1U) in CF(1), and with A(3w) in CF(3), is positioned above, rather than below, the stylus-supporting arm A(9w), which corresponds, in CF(9), with A(1u) in CF(1) and with A(3v) in CF(3). As indicated in FIGURES 12 and 13, CF(1) is immediately connected to CF(2) of the double multiplier, and CF(9) is immediately connected to CF(3).

The mechanism of Unit I is supported by the four parallel straight, rigid, interchangeable pillars P($i$.I), $1 \leq i \leq 4$; the pillar P(1.I) being composed of the parts P(1.1), P(1.2), P(1.L), P(1.3), and P(1.9). In the same way, the pillar P(2.I) is composed of the parts P(2.1), P(2.$m$), and P(2.9); the pillar P(3.I) is composed of the parts P(3.1), P(3.m), and P(3.9); and the pillar P(4.I) is composed of the parts P(4.1), P(4.m), and P(4.9). The pillars P(i.I), $1 \leq i \leq 4$, stand on the corners if a square congruent with the square on which the pillars P(i.3), $1 \leq i \leq 4$, stand. In addition to these connections between the pillars of the three major components of Unit I, namely CF(1), the double multiplier, and CF(9), the stylus-supporting arms A(1U) and A(2U) are rigidly connected to each other, and the stylus-supporting arms A(3w) and A(9w) are rigidly connected to each other. The rigid connection between A(1U) and A(2U) is made by means of the rigid members C(1U) and C(2U), (C(1U) being parallel to C(2U) and to each of the pillars P(i.I), $1 \leq i \leq 4$, and perpendicular to A(1U) and A(2U). That is, the four rigidly connected members A(1U), C(1U), C(2U) and A(2U) together form a rigid rectangular piece shown in FIGURE 16. In the same way, the stylus-supporting arms A(3w) and (9w) are rigidly connected to each other by the parallel, rigid, members C(1w) and C(2w), C(1w) and C(2w) being parallel to C(1U) and perpendicular to A(3w) and A(9w). The rigid, rectangular piece composed of the members A(3w), A(9w) C(1w), and C(2w) is interchangeable with the piece composed of the members A(1U), A(2U), C(1U) and C(2U). These are the only immediate, physical, connections between the major components of Unit I. (In FIGURE 13, BD(1) is shown cut away, and BD(3) and BD(9) are not shown. Also, A(1u) is shown cut away, as are F(1U.2), F(1B.2), F(1B.4), F(2U.2), F(3B.2), F(3B.4). Also, the scales SF(1u) and SF(9W) are not shown, nor are the indicator wires IW(u) and IW(W), nor are the scales and indicator wires of the double multiplier shown.)

In the same way that the real variable $v$ represents the directed distance, at any time, of the longitudinal centerline of A(3v) from its neutral position, so the real variables $u$ and W represent the directed distances from their neutral positions of the longitudinal centerlines of A(1u) and A(9W), respectively. In their neutral positions, the axis of rotation of ML(1) intersects the longitudinal centerlines of A(1u) and A(9W) at right angles, and the numbers on the scales SF(1u) and SF(9W) under the indicator wires IW(u) and IW(W) are zero. In any particular position of A(1u) the value of $u$ is the number on the scale SF(1u) under IW(u); and in the same way, for any particular position of A(9W) the value of W is the number on the scale SF(9W) under IW(W). (A(1U) is constrained by C(1U) and C(2U) to move with A(2U); the directed distance from its neutral position through which the longitudinal centerline of A(1U) has moved is, at any time, equal to the directed distance through which the longitudinal centerline of A(2U) has moved from its neutral position. The directed distances of the longitudinal centerlines of A(1U) and A(2U) from their neutral positions being the same, they are both represented by the same variable, namely U. In the same way, $w$ represents the directed distances through which the longitudinal centerlines of A(3w) and A(9w) have moved from their neutral positions, these directed distances being always the same.)

With rectangular Cartesian axes chosen as before on the plane of the working face of BD(3) or on any parallel plane, such that the origin is the point of intersection of the axis of rotation of ML(1) with the $xy$ plane, the $x$-axis being parallel to the longitudinal centerlines of A(1U), A(2U), A(3w), and A(9w), and the $y$-axis being parallel to the longitudinal centerlines of A(1u), A(2z), A(3v), and A(9W); the projections on the $xy$ plane of the longitudinal centerlines of A(1u), A(1U), A(2z), A(3v), A(3w), A(9W), A(9w), and LA(1)—LA(2) are defined by the equations $x=u$, $y=U$, $x=z$, $y=U$, $x=v$, $y=w$, $x=W$, $y=w$, and $$y=(U/z)x=(w/v)x$$

respectively, and the coordinates of the points of intersection of the longitudinal centerlines of S(1), SE(2), S(3), and S(9) with the $xy$ plane are $(u,U)$, $(z,U)$, $(v,w)$ and $(W,w)$, respectively.

This information is summarized in the following table:

TABLE 3

| Subassembly of Unit I | | Stylus-supporting or stylus-connecting arms | Equation of projection of longitudinal centerline of arms on $xy$ plane | Stylus, stylus-extension, or SEC | Coordinates of point of intersection with $xy$ plane of longitudinal centerline of stylus or SE or SEC |
|---|---|---|---|---|---|
| CF (1) | | A(1u) | $x=u$ | S(1) | $(u, U)$ |
| | | A(1U) | $y=U$ | | |
| Double multiplier | CF (2) | A(2z) | $x=z$ | SE(2) | $(z, U)$ |
| | | A(2U) | $y=U$ | | |
| | ML (1) | LA(1) | $y=(w/v)x$ | SEC(2) | $(z, U)$ |
| | | LA(2) | $=(U/z)x$ | SEC(3) | $(v, w)$ |
| | CF (3) | A(3v) | $x=v$ | S(3) | $(v, w)$ |
| | | A(3w) | $y=w$ | | |
| CF (9) | | A(9W) | $x=W$ | S(9) | $(W, w)$ |
| | | A(9w) | $y=w$ | | |

It should be noted that $wz-Uv=0$, that the ordinates of the points of intersection with the $xy$ plane of the longitudinal centerlines of S(1) and SE(2) are equal, and that the ordinates of the points of intersection with the $xy$ plane of the longitudinal centerlines of S(3) and S(9) are equal. The stylus-supporting and stylus-connecting arms, the styli, the stylus-extension SE(2), and the stylus-extension-cylinders of Unit I may move in any manner such that their corresponding positions at any time are given by Table 3.

In particular, when S(1) moves, the point $(u, U)$ moves over some curve which may, in general, be defined by an equation of the form $f_1(x, y)=0$, so that $f_1(u, U)=0$. In the same way, when SE(2) moves, a relation is established between $z$ and U which may, in general, be expressed by the equation $f_2(z, U)=0$; when S(3) moves a relation is established between $v$ and $w$ which may, in general, be expressed by the equation $f_3(v, w)=0$; and when S(9) moves a relation is established between W and $w$ which may, in general, be expressed by the equation $f_9(W, w)=0$.

When S(1) moves, unless the path over which $(u, U)$ moves is a straight line parallel to the $x$-axis, SE(2) moves; and when SE(2) moves, unless the path over which $(z, U)$ moves is a straight line parallel to the $x$-axis, S(1) moves. Also, when SE(2) moves, unless the path over which $(z, U)$ moves a straight line through the origin and unless $v=w=0$, S(3) moves; and when S(3) moves, unless the path over which $(v, w)$ moves is a straight line through the origin and unless $z=U=0$, SE(2) moves. Also, when S(3) moves, unless the path over which $(v, w)$ moves is a straight line parallel to the $x$-axis, S(9) moves; and when S(9) moves, unless the path over which $(W, w)$ moves is a straight line parallel to the $x$-axis, S(3) moves. Therefore, in general, when one of S(1), SE(2), S(3), and S(9) moves, the others move. When S(1), SE(2), S(3) and S(9) all move, the equations $f_1(u, U)=0$, $f_2(z, U)=0$, $f_3(v, w)=0$, $f_9(W, w)=0$, and $wz-Uv=0$, must be satisfied simultaneously by corresponding real value of $u$, U, $v$, $w$, W, and $z$. (Trivially, when one or more of S(1), SE(2), S(3), and S(9) is held fast, the function or functions stating the relation between the coordinates of the point, or points, of intersection with the $xy$ plane of the longitudinal centerline, or centerlines, of the fixed member or members reduces to the identity function.) Therefore, always, the functions $$f_1(u, U) = 0$$
$$f_2(z, U) = 0$$
$$f_3(v, w) = 0$$
$$f_9(W, w) = 0, \text{ and}$$
$$g^9(U, v, w, z) = wz - Uv = 0$$

must be satisfied simultaneously, each of the functions $f_i$ $i=1, 2, 3, 9$, being such that it may be represented by a contonuous segment of some plane curve. That is $S(1)$, $SE(2)$, $S(3)$, and $S(9)$ may move in any manner such that these five equations are satisfied simultaneously; actual movement of $S(1)$, $SE(2)$, $S(3)$, or $S(9)$ being the equivalent of the specification of $f_1$, $f_2$, $f_3$, or $f_9$, respectively. In accordance with these restrictions, the operator may move two of the members $S(1)$, $SE(2)$, $S(3)$, and $S(9)$ in any manner whatever: $S(1)$ and either $S(3)$ or $S(9)$; $SE(2)$ and $S(9)$; $S(3)$ and $S(1)$; or $S(9)$ and either $S(1)$ or $SE(2)$. That is, a choice by the operator of the functions $f_1$ and either $f_3$ or $f_9$, or of $f_2$ and $f_9$, or of $f_3$ and $f_1$, or of $f_9$ and either $f_1$ or $f_2$, restricts, but in general does not determine, his choice of the remaining two functions $f_i$. For example, if $f_1$ is chosen to be the function $u^2 - U = 0$, then $f_2$ may not be, for example, $z^2 + u + 4 = 0$; but if $f_1$ is $u^2 - U = 0$, then either $f_3$ or $f_9$ but not both, may be any function which may be represented by a continuous segment of some plane curve. (If the operator had chosen $f_1$ to be the function $u^3 - U = 0$, for example, he would not have restricted his choice of $f_2$ whatever.) That is, if $u^2 - U = 0$, then $U = u^2$, and if $z^2 + U + 4 = 0$, then $U = -z^2 - 4$, so that $u^2 + z^2 + 4 = 0$, but there are no corresponding, real values of $u$ and $z$ which satisfy this equation, so that not both $f_1(u, U) = u^2 - U = 0$ and $f_2(z, U) = z^2 + U + 4 = 0$; but if $U = u^3 = -z^2 - 4$, there are corresponding real values of $z$ and $u$ which satisfy this equation so that if $f_1(u, U) = u^3 - U = 0$, $f_2$ may be the function $f_2(z, U) = z^2 + U + 4 = 0$, and in general if $U$ is eliminated between the equations $U = u^3$ and $f_2(z, U) = 0$, $f_2$ being such that it may be represented by a continuous segment of some plane curve, the resulting equation in $z$ and $u$ is always such that there are corresponding real values of $z$ and $u$ which satisfy it.

One way in which Unit I may be used was illustrated in the preceding paragraph: it may be used to determine whether or not there exist corresponding real values of the variables $u$, $U$, $v$, $w$, $W$, and $z$ which satisfy the four equations $f_i = 0$, $i = 1, 3, 9$ and $wz - Uv = 0$, and if such values exist the instrument may be used to find them. In general, the procedure may be described as follows: Given the three functions $f_i$, $i = 1, 3, 9$ to find corresponding real values of $u$, $U$, $v$, $w$, $W$, and $z$ which satisfy these equations and the equation $wx - Uv = 0$ simultaneously, if any such values exist, the three functions $f_i$, $i = 1, 3, 9$ being such that each of them may be represented by a continuous segment of some plane curve. Construct the three curves $f_i(x_i, y_i) = 0$, $i = 1, 3, 9$ on separate sheets of graph paper, using the same convenient scale throughout. Place the curve $f_1(x_1, y_1) = 0$ on BD(1) such that the $x_1$ axis on the graph paper joins the zeros of the scales SB(1.1) and SB(1.3), and so that the $y_1$ axis joins the zeros of the scales SB(1.2) and SB (1.4). Then the projection on the $xy$ plane of the $x_1$ axis is the $x$-axis, and the projection on the $xy$ plane of the $y_1$ axis is the $y$-axis, and the projection on the $xy$ plane of the curve $f_1(x_1, y_1) = 0$ is th curve $f_1(x, y) = 0$. When the point of the stylus $S(1)$ is moved over the curve $f_1(x_1, y_1) = 0$, the point $(u, U)$ moves over the curve $f_1(x, y) = 0$, thus establishing the relation expressed by the equation $f_1(u, U) = 0$ between $u$ and $U$. In the same way that the curve $f_1(x_1, y_1) = 0$ was placed on BD(1), place the curves $f_3(x_3, y_3) = 0$ on BD(3) and the curve $f_9(x_9, y_9) = 0$ on BD(9), the projections of the $x_3$ and $x_9$ axes on the $xy$ plane being colinear with the $x$-axis and the projections on the $xy$ plane of the $y_3$ and $y_9$ axes being colinear with the $y$-axis. Then when the point of $S(3)$ is moved over the curve $f_3(x_3, y_3) = 0$, the point $(v, w)$ moves over the curve $f_3(x, y) = 0$; and when the point of $S(9)$ is moved over the curve $f_9(x_9, y_9) = 0$, the point $(W, w)$ moves over the curve $f_9(x, y) = 0$, thus establishing the relations between $v$ and $w$ and between $W$ and $w$ expressed by the equations $f_3(v, w) = 0$ and $f_9(W, w) = 0$ respectively. If $S(1)$, $S(3)$, and $S(9)$ can be moved over their curves simultaneously, there are corresponding real values of $u$, $U$, $v$, $w$, $W$, and $z$ which do satisfy the equations $f_1(u, U) = 0$, $f_3(v, w) = 0$, $f_9(W, w) = 0$, and $wz - Uv = 0$ simultaneously, these values being the numbers on the scales SF(1$u$) under IW($u$), SF(2$U$) under IW($U$), SF(3$v$) under IW($v$), SF(3$w$) under IW($w$), SF(9$W$) under IW($W$), and SF($az$) under IW($z$), respectively. If there are no corresponding values of $u$, $U$, $v$, $w$, $W$, and $z$ which satisfy these equations, it will be physically impossible to place the points of the styli $S(1)$, $S(3)$, and $S(9)$ on their respective curves, simultaneously.

As previously indicated, $S(1)$ and $S(9)$ may be simultaneously moved over any plane curves whatever. When $S(1)$ is moved over some curve $y_1 = f_1(x_1)$, so that the point $(u, U)$ moves over the curve $y = f_1(x)$, so that $U = f_1(u)$, if $U$ is eliminated between the equations $U = f_1(u)$ and $wz - UV = 0$, the resulting equation is $wz = vf_1(u) = 0$. That is $f_1(u)$ may be substituted for $U$ in the equation $wz - Uv = 0$, by means of tracing over the curve $y_1 = f_1(x_1)$ with the stylus $S(1)$, the $x_1$ axis being colinear with the line joining the zeros of the scales SB(1.1) and SB(1.3), and the $y_1$ axis being colinear with the line joining the zeros of the scales SB(1.2) and SB(1.4). That is, the four stylus-supporting arms A(1$u$), A(2$z$), A(3$v$), and A(3$w$) may be constrained to move so that corresponding values of $u$, $v$, $w$, and $z$ satisfy the equation $wz - vf_1(u) = 0$, by moving the point of $S(1)$ over the curve $y_1 = f_1(x_1)$. In the same way $f_9(W)$ may be susbstituted for $w$ in the equation $wz - Uv = 0$, resulting in the equation $zf_9(W) - Uv = 0$, by tracing over the curve $y_9 = f_9(x_9)$, properly aligned on BD(9), with the stylus $S(9)$; the equation $zf_9(W) - Uv = 0$ expressing the relation between the corresponding positions of the stylus-supporting arms A(2$U$), A(3$v$), A(9$W$), and A(2$z$) resulting from the movement of $S(9)$ over the curve $y_9 = f_9(x_9)$. If both of these substitutions are made simultaneously, as them may be, regardless of the specific forms of $f_1$, and $f_9$, if only $f_1$ and $f_9$ may be represented by continuous segments of plane curves, the resulting equation is $zf_9(W) - vf_1(u) = 0$, this equation expressing the relation established between the corresponding positions of A(1$u$), A(2$z$), A(3$v$), and (A9$W$) by means of moving $S(1)$ and $S(9)$ over the curves $y_1 = f_1(x_1)$ and $y_9 = f_9(x_9)$, respectively, simultaneously. Also, in the same way, a function of $v$ may be substituted for $w$ in the equation $wz - Uv = 0$, or a function of $w$ may be substituted for $v$, either separately or in conjunction with either or both of the substitutions just described. (When both $f_3(v)$ is substituted for $w$ or $f_3(w)$ is substituted for $v$ and $f_9(w)$ is substituted for $v$ and $f_9(w)$ is substituted for $W$ or $f_9(W)$ is substituted for $w$, the functions $f_3$ and $f_9$ must be such that there are corresponding real values of $v$, $w$, and $W$ which satisfy them simultaneously.) For example, if $$U - f_1(u) = 0, \; w - f_9(W) = 0, \; v - f_3(w) = 0$$

and $wz - Uv = 0$ are such that they may be satisfied by corresponding real values of $u$, $U$, $v$, $w$, $W$, and $z$, then the substitution $v = f_3(w) = f_3(f_9(W))$ may be made by constraining the styli $S(1)$, $s(3)$, and $S(9)$ to follow, simultaneously, the curves $y_1 = f_1(x_1)$, $x_3 = f_3(y_3)$, and $y_9 = f_9(x_9)$, respectively. In this case the equation $zf_9(W) - f_1(u)f_3(f_9(W)) = 0$ expresses the relation established between corresponding positions of $A(1u)$, $A(2z)$, and $A(9W)$ with respect to their neutral positions.

These examples illustrate the use of Unit I; it may be used to solve certain sets of simultaneous equations, to determine whether or not such (real) solutions exist, or to constrain the motion of certain of its parts in such a way that their corresponding positions satisfy certain equations, for example. In conjunction with Unit II, Unit I may be used to construct certain curves; and certain further relations between the variables $u$, $v$, $W$, and $z$ may be established, by means of the relations between these variables and the variable $V$, as will be described below.

As shown in FIGURES 14, 15 and 19, Unit II consists of the four curve followers $CF(4)$, $CF(5)$, $CF(6)$ and $CF(10)$. $CF(4)$ is interchangeable with $CF(1)$, except that there is no scale attached to $F(4u.1)$, no indicator wire attached to $TF(4u.1)$ and except for the scale $SF(4V)$ attached to $F(4V.2)$ and the indicator wire $IW(V)$ attached to $TF(4V.2)$. (Neither $SF(4V)$ nor $IW(V)$ is shown in the drawings; $SF(4V)$ is interchangeable with $SF(1u)$, and $IW(V)$ is interchangeable with $IW(u)$.) $SF(4V)$ is the only scale in Unit II except for the four scales near the edges of each of the four drawing boards of Unit II, and $IW(V)$ is the only indicator wire of Unit II. Except for the scale $SF(4V)$ and the indicator wire $IW(V)$, which are not duplicated in $CF(6)$, $CF(6)$ is interchangeable with $CF(4)$. $CF(5)$ is interchangeable with $CF(6)$, except that $A(5z)$ and its supporting members are below $A(5V)$ and its supporting members, while $A(6v)$ and its supporting members are above $A(6V)$ and its supporting members. $CF(5)$ is interchangeable with $CF(10)$.

The members of adjacent pairs of curve followers in Unit II are connected to each other in the same way that $CF(1)$ is connected to $CF(2)$, which is the same as the manner in which $CF(3)$ is connected to $CF(9)$; the adjacent pairs of curve followers in Unit II being $CF(4)$ and $CF(5)$, $CF(5)$ and $CF(6)$, and $CF(6)$ and $CF(10)$. That is, the four pillars $P(1.4)$, $P(1.5)$, $P(1.6)$ and $P(1.10)$ are rigidly connected to each other to form the single straight rigid pillar $P(1.II)$ interchangeable with any of the pillars $P(i.I)$, $1 \leq i \leq 4$. In the same way, the pillar $P(2.II)$ is composed of $P(2.i)$, $i=4, 5, 6, 10$; $P(3.II)$ is composed of the pillars $P(3.i)$, $i=4, 5, 6, 10$; and $P(4.II)$ is composed of $P(4.i)$, $i=4, 5, 6, 10$. Each of the pillars $P(i.II)$, $1 \leq i \leq 4$, is interchangeable with each of the four pillars $P(i.I)$, $1 \leq i \leq 4$. The four pillars $P(i.II)$, $1 \leq i \leq 4$, stand on the corners of a square congruent with the square on which the pillars $P(i.I)$, $1 \leq i \leq 4$ stand. Also, the parallel stylus-supporting arms $A(iV)$, $i=4, 5, 6, 10$ are rigidly connected to each other by the straight rigid parallel members $C(1V)$ and $C(2V)$, $C(1V)$ and $C(2V)$ being perpendicular to $A(iV)$, $i=4, 5, 6, 10$, and parallel to each of the pillars $P(i.II)$, $1 \leq i \leq 4$. The single rigid member formed from $A(iV)$, $i=4, 5, 6, 10$, and $C(1V)$ and $C(2V)$ is shown in FIGURE 18. These are the only direct physical connections between the four major components of Unit II, that is between $CF(4)$, $CF(5)$, $CF(6)$, and $CF(10)$.

Units I and II are rigidly connected to each other in such a way that the pillars $P(i.I)$, $1 \leq i \leq 4$, are parallel to the pillars $P(i.II)$, $1 \leq i \leq 4$, such that the congruent squares on which Units I and II stand are coplanar, such that the line joining the centers of the two squares (that is, the two points of intersection of the diagonals of the squares) is parallel to the longitudinal centerlines of $A(1U)$ and $A(4V)$, and such that the distance between these centers is sufficient to allow $C(1V)$ to move freely without interference from $FL(1)$. Specifically, the straight rigid member $F(1.4.1)$ is rigidly connected to each of the pillars $P(2.I)$ and $P(1.II)$ such that the longitudinal centerlines of $F(1u.1)$, $F(1.4.1)$, and $F(4u.1)$ are colinear and perpendicular to the pillars $P(2.I)$ and $P(i.II)$. In the same way, the members $F(1.4.2)$, $F(2.5.1)$, $F(2.5.2)$, $F(3.6.1)$, $F(3.6.2)$, $F(9.10.1)$ and $F(9.10.2)$, each of these members being interchangeable with $F(1.4.1)$, are connected between the pillars $P(2.1)$ and $P(1.II)$; $F(1.4.2)$ being colinear with $F(1u.2)$ and $F(4u.2)$, $F(2.5.1)$ being colinear with $F(2z.1)$ and $F(5z.1)$, $F(2.5.2)$ being colinear with $F(2z.2)$ and $F(5z.2)$, $F(3.6.1)$ being colinear with $F(3v.1)$ and $F(6v.1)$, $F(3.6.2)$ being colinear with $F(3v.2)$ and $F(6v.2)$, $F(9.10.1)$ being colinear with $F(9W.1)$ and $F(10W.1)$, and $F(9.10.2)$ being colinear with $F(9W.2)$ and $F(10W.2)$. In addition to these connections between the frames of Units I and II, the stylus-supporting arms $A(1u)$ and $A(4u)$ are rigidly connected to each other by the straight, rigid, parallel members $C(1u)$ and $C(2u)$, $C(1u)$ and $C(2u)$ being perpendicular to $A(1u)$ and $A(4u)$. In the same manner, $A(2z)$ and $A(5z)$ are rigidly connected to each other by $C(1z)$ and $C(2z)$; $A(3v)$ and $A(6v)$ are rigidly connected by $C(1v)$ and $C(2v)$; and $A(9W)$ and $A(10W)$ are rigidly connected by $C(1W)$ and $C(2W)$. The four rigidly connected pieces $A(1u)$, $C(1u)$, $A(4u)$, and $C(2u)$ form a single part, shown in FIGURE 17 interchangeable with the parts formed by $A(2z)$, $C(1z)$, $A(5z)$, and $C(2z)$; by $A(3v)$, $C(1v)$, $A(6v)$, and $C(2v)$; and by $A(9W)$, $C(1W)$, and $C(2W)$. The lengths of the interchangeable members $C(iu)$, $C(iz)$, $C(iv)$, and $C(iW)$, $1 \leq i \leq 2$, are such that the distance between the longitudinal centerlines of $A(1u)$ and $A(4u)$ is equal to the distance between the centers of the squares on which Units I and II stand. These are the only physical connections between Units I and II. It should be noted that the function generator and control mechanism may be described, not as a collection of a curve followers, but rather as a collection of parts of the three kinds shown in FIGURES 16, 17 and 18, together with appropriate styli, drawing boards, frame, etc.

In the same way that the real variable $v$ represents the directed distance, at any time, through which the longitudinal centerline of $A(3v)$ has moved from its neutral position, so the real variable $V$ represents the directed distance, at any time, through which the longitudinal centerline of $A(4V)$ has moved from its neutral position. When $A(4V)$ is in its neutral position, the line through the center of the square on which Unit II stands, parallel to the longitudinal centerline of any of the pillars $P(i.II)$, $1 \leq i \leq 4$, intersects the longitudinal centerline of $A(4V)$ at right angles, and also, incidentally, the longitudinal centerlines of $A(5V)$, $A(6V)$, and $A(10V)$, at right angles. The number on the scale $SF(4V)$ under $IW(V)$ attached to $TF(4V.2)$ is zero, when $A(4V)$ is in its neutral position. In any particular position of $A(4V)$, the value of $V$ is the number on the scale $SF(4V)$ under $IW(V)$. In the same way that $A(1U)$ and $A(2U)$ move together, so that the variable $U$ indicates the positions of both $A(1U)$ and $A(2U)$, so $A(4V)$, $A(5V)$ $A(6V)$, and $A(10V)$ are constrained by $C(1V)$ and $C(2V)$ to move together, so that $V$ represents the directed distance through which any of the longitudinal centerlines of $A(4V)$, $A(5V)$, $A(6V)$, and $A(10V)$ has moved from its neutral position.

In much the same way that $A(iV)$, $i=4, 5, 6, 10$, are constrained to move together, $A(1u)$ and $A(4u)$ are constrained to move together by $C(1u)$ and $C(2u)$. When $A(1u)$ is in its neutral position, $A(4u)$ is in its neutral position; when $A(1u)$ has moved to a position close to $F(1U.2)$ in which $TA(1U)$ touches $TF(1U.2)$, $A(4u)$ has moved to a position close to $F(4V.2)$ in which $TA(4V)$ touches $TF(4V.2)$; and when $A(1u)$ has moved to a position close to $F(1U.1)$ in which $TA(1U)$ touches $TF(1U.1)$, $A(4u)$ has moved to a position close to $F(4V.1)$ in which $TA(4V)$ touches $TF(4V.1)$. The directed distance through which the longitudinal centerline of $A(1u)$ has moved from its neutral position is always the same as the directed distance through which the longitudinal centerline of $A(4u)$ has moved from its neutral position, so that the positions of both $A(1u)$ and $A(4u)$ are indicated by the variable u. In the same way, z represents the directed distance through which the longitudinal centerline of $A(5z)$ has moved from its neutral position, this directed distance being always equal to the directed distance through which the longitudinal centerline of $A(2z)$ has moved from its neutral position, at any time. Also, in the same way, the real variable v represents the directed distances through which the longitudinal centerlines of $A(3v)$ and $A(6v)$ have moved from their neutral positions, these directed distances being always equal. Also, in the same way, the real variable W represents the directed distances through which the longitudinal centerlines of $A(9W)$ and $A(10W)$ have moved from their neutral positions, at any time, these directed distances being always equal to each other.

If reference axes are chosen on the surface of $BD(4)$, or on the paper attached to $BD(4)$, so that the $x_4$ axis joins the zeros of the scales $SB(4.1)$ and $SB(4.3)$, and so that the $y_4$ axis joins the zeros of the scales $SB(4.2)$ and $SB(4.4)$, then the point of the stylus $S(4)$ always has the coordinates $x_4=u$, $y_4=V$, the line $x_4=u$ being the projection on the drawing board of the longitudinal centerline of $A(4u)$ and the line $y_4=V$ being the projection on $BD(4)$ of the longitudinal centerline of $A(4V)$. In the same way, if the $x_5$ axis joins the zeros of the scales $SB(5.1)$ and $SB(5.3)$, and if the $y_5$ axis joins the zeros of the scales $SB(5.2)$ and $SB(5.4)$, then the coordinates of the point of the stylus $S(5)$, referred to the $x_5$ and $y_5$ axes, are $(z, V)$; the line $x_5=z$ being the projection on the face of $BD(5)$ of the longitudinal centerline of $(A5z)$, and the line $y_5=V$ being the projection on the face of $BD(5)$ of the longitudinal centerline of $A(5V)$. In the same way, if the $x_6$ axis joins the zeros of the scales $SB(6.1)-SB(6.3)$, and if the $y_6$ axis joins the zeros of the scales $SB(6.2)-SB(6.4)$, then the coordinates of the point of the stylus $S(6)$, referred to the $x_6$ and the $y_6$ axes, are $(v, V)$, the line $x_6=v$ being the projection on the face of $BD(6)$ of the longitudinal centerline of $A(6v)$, and the line $y_6=V$ being the projection on the face of $BD(6)$ of the longitudinal centerline of $A(6V)$. In the same way, if the $x_{10}$ axis joins the zeros of the scales $SB(10.1)-SB(10.3)$, and if the $y_{10}$ axis joins the zeros of the scales $SB(10.2)-SB(10.4)$, then the coordinates of the point of the stylus $S(10)$ are $(W, V)$, referred to the $x_{10}$ and $y_{10}$ axes. The line $x_{10}=W$ is the projection on the face of $BD(10)$ of the longitudinal centerline of $A(10W)$, and the line $y_{10}=V$ is the projection on the face of $BD(10)$ of the longitudinal centerline of $A(10V)$. This information is summarized in the following table:

TABLE 4

| Column 1 | Column 2 | Column 3 | Column 4 | Column 5 |
|---|---|---|---|---|
| CF(4) | $A(4u)$ | $x_4 = u$ | S(4) | $(u, V)$ |
|  | $A(4V)$ | $y_4 = V$ |  |  |
| CF(5) | $A(5z)$ | $x_5 = z$ | S(5) | $(z, V)$ |
|  | $A(5V)$ | $y_5 = V$ |  |  |
| CF(6) | $A(6v)$ | $x_6 = v$ | S(6) | $(v, V)$ |
|  | $A(6V)$ | $y_6 = V$ |  |  |
| CF(10) | $A(10W)$ | $x_{10} = W$ | S(10) | $(W, V)$ |
|  | $A(10V)$ | $y_{10} = V$ |  |  |

NOTE.—Column 1 lists the major subassemblies of Unit II; Column 2 lists the stylus-supporting arms of Unit II; Column 3 lists the equations of the projections of the stylus-supporting arms on the boards of the curve followers of which the arms are a part, the equations being referred to the axes of the curve followers as previously described; Column 4 lists the styli of Unit II; Column 5 lists the coordinates of the points of the styli, referred to the axes of the curve followers, as previously described.

The stylus-supporting arms and styli of Unit II may move in any manner such that the position of the stylus-supporting arm or stylus in question is always given by Table 4. It should be noted that the ordinates of the points of S(4), S(5), S(6), and S(10) are equal.

If the $x_i y_i$, $1 \leq i \leq 6$, $i=9, 10$, planes are translated in space so as to be coincident with the $xy$ plane, then the equations of the projections of the longitudinal centerlines of the stylus-supporting arms may be listed as follows:

$\left.\begin{array}{l}A(1u) \\ A(4u)\end{array}\right\} x=u$  $\qquad$  $\left.\begin{array}{l}A(3w) \\ A(9w)\end{array}\right\} y=w$ $\left.\begin{array}{l}A(1U) \\ A(2U)\end{array}\right\} y=U$  $\qquad$  $\left.\begin{array}{l}A(9W) \\ A(10W)\end{array}\right\} x=W$ $\left.\begin{array}{l}A(2z) \\ A(5z)\end{array}\right\} x=z$  $\qquad$  $\left.\begin{array}{l}A(4V) \\ A(5V) \\ A(6V) \\ A(10V)\end{array}\right\} y=V$ $\left.\begin{array}{l}A(3v) \\ A(6v)\end{array}\right\} x=v$ Also, the coordinates of the points of the styli and of the point of intersection of the longitudinal centerline of $SE(2)$ with the $xy$ plane may be listed as follows:

S(1) $(u, U)$  S(4) $(u, V)$
SE(2) $(z, U)$  S(5) $(z, V)$
S(3) $(v, W)$  S(6) $(v, V)$
S(9) $(W, w)$  S(10) $(W, V)$

These lines and points are shown in FIGURE 20, which may also be considered an abstraction from FIGURE 19, showing the longitudinal centerlines of the stylus-supporting and stylus-connecting arms of Units I and II, indicating the relative positions of the longitudinal centerlines of S(1), SE(2), S(3), and S(9); also showing the longitudinal centerline of $A(4V)$, extended, to indicate the relative positions of S(4), S(5), S(6), and S(10).

Whenever S(4) moves, the point of S(4) moves over some curve $f_4(x_4, y_4)=0$, so that the relation expressed by the equation $f_4(u, V)=0$ is established between u and V. In the same way, when S(5) moves, the point of S(5) moves over some curve $f_5(x_5, y_5)=0$, and the stylus supporting arms $A(5z)$ and $A(5V)$ move so that z and V always satisfy the equation $f_5(z, V)=0$. In the same way, when S(6) moves, the relation expressed by the equation $f_6(v, V)=0$ is established between v and V; and in the same way, when S(10) moves, the relation expressed by the equation $f_{10}(W, V)=0$ is established between W and V.

Whenever any one of S(4), S(5), S(6), or S(10) moves in such a way that the path over which its point moves is not a straight line parallel to the longitudinal centerline of $A(4V)$, then the other styli of Unit II also move. Therefore, in general, when any stylus of Unit II moves, all move. When all of the styli of Unit II move the relations established by their movements between the variables $u$, $v$, $W$, $z$, and $V$ are in general expressed by the equations $f_4(u, V)=0$
$f_5(z, V)=0$
$f_6(v, V)=0$, and
$f_{10}(W, V)=0$ these equations being satisfied simultaneously by corresponding real values of $u$, $v$, $W$, $z$ and $V$, these values being the numbers simultaneously under $IW(u)$, $IW(v)$, $IW(W)$, $IW(z)$, and $IW(V)$ on the scales $SF(1u)$, $SF(3v)$, $SF(9W)$, $SF(2z)$, and $SF(4V)$, respectively. When one or more of S(4), S(5), S(6), and S(10) is not moving, or when one or more of these styli is moving on a line parallel to the longitudinal centerline of $A(4V)$, the equation stating the relation thus established between the variables u and V, z and V, v and V, and/or W and V, reduces to a trival case, so that, always, the relations between the corresponding, simultaneous, positions of the stylus-supporting arms of Unit II are given by the above list. That is $f_4$, $f_5$, $f_6$, and $f_{10}$ in the above list must be such that each of them may be represented by a continuous segment of some plane curve, and each of these functions must be such that all of them may be satisfied simultaneously by corresponding real values of $u$, $v$, $W$, $z$, and V. In general, the operator may choose any one of these functions from among those functions which may be represented by a continuous segment of some plane curve. Having chosen one of these functions, the choice of the remaining three is, in general, restricted, though not determined.

In addition to the requirement that there shall be corresponding real valves of $u$, $v$, V, W, and $z$ which simultaneously satisfy the equations $f_4(u, V)=0$, $f_5(z, V)=0$, $f_6(v, V)=0$, and $f_{10}(W, V)=0$, the requirement that there shall be corresponding real values of $u$, $v$, W, and $z$ which simultaneously satisfy the equations $f_1(u, U)=0$, $f_2(z, U)=0$, $f_3(v, W)=0$, $f_9(W, w)=0$, and $wz-Uv=0$, remains valid. The complete list of simultaneous equations which must be satisfied by corresponding real values of $u$, U, $v$, V, $w$, W, and $z$ is given by the following list:

TABLE 5

| Column 1 | Column 2 |
|---|---|
| $f_1(u, U)=0$ | $f_4(u,V)=0$ |
| $f_2(z, U)=0$ | $f_5(z, V)=0$ |
| $f_3(W, w)=0$ | $f_6(v, V)=0$ |
| $g_9(U, v, w, z)=wz-Uv=0$ | $f_{10}(W, V)=0$, and |

It should be noted that Table 5 essentially duplicates Table 2. In Table 5, column 1 refers primarily to Unit I and column 2 refers primarily to Unit II. That is, the various styli, stylus-supporting arms, stylus-connecting arms, the stylus-extension SE(2), and the stylus-extension-cylinders of Unit I move in accordance with the restrictions indicated by column 1 of Table 5, and these only, when all connections between Units I and II are broken. Also, in this case, with no connection between Units I and II, the styli and stylus-supporting arms of Unit II move in accordance with the restrictions indicated in column 2 of Table 5, and these only. When Units I and II are connected in the manner described, the styli, stylus-supporting arms, and other movable parts of Units I and II may move in any manner such that the nine equations of Table 5 are satisfied simultaneously by corresponding real values of $u$, U, $v$, V, $w$, W, and $z$.

Since both Units I and II are primarily components of the complete function generator and control mechanism, neither being intended, primarily, to be used alone, little emphasis is placed on their separate capabilities, in this paper. However, Unit II could be used, for example, to test any particular set of four equations similar in form to those listed in column 2 of Table 5, to discover whether or not corresponding values of the five variables existed which would simultaneously satisfy the equations. If such values did exist, and only then, the four styli of Unit II could be so disposed that their points were points of the respective curves representing the equations. To find the corresponding values of the variables $u$, $v$, W, and $z$, it would be convenient if scales duplicating the scales SF(1$u$), SF(3$v$), SF(9W) and SF(2$z$) were attached to F(4$u$.1), F(6$v$.1), F(10W.1), and F(5$z$.1), respectively, and also if indicator wires duplicating IW($u$), IW($v$), IW(W), and IW($z$) were attached to TF(4$u$.1), TF(6$v$.1), TF(10W.1), and TF(5$z$.1), respectively. However, since Unit II may be used to test such a set of four equations to find whether or not they are simultaneous, in the manner described, whether or not Units I and II are connected, it has not been thought necessary to include these extra scales and indicator wires as part of the standard equipment of Unit II. When Units I and II are connected to each other in the manner described above, corresponding values of $u$, $v$, V, W, and $z$ which satisfy the equations of column 2 of Table 6 may be read from scales SF(1$u$), SF3$v$), SF(4V), SF(9W), and SF(2$z$), under IW($u$), IW($v$), IW(V), IW(W), and IW($z$), respectively, whenever such corresponding real values of $u$, $v$, V, W, and $z$ exist. It should be noted that, just as Unit II may be used, when connected to Unit I, in the same manner that it might be used separately, so the connection between Units I and II does not impair, in any way, the separate use of Unit I as previously described.

However, Units I and II together may be used in additional ways not possible for either alone. For example, it is possible to use Units I and II together to construct the graph of any of a large variety of equations involving two variables:

For example, to construct the graph of any equation of the form $xy=k$, in which $k$ is any real constant: Set $U=1$; that is, clamp A(1U)—A(2U) in such a position that the number on the scale SF(2U) under IW(U) is 1. In the same way, clamp A(3$v$) in such a position that the number on the scale SF(3$v$) under IW($v$) is $k$, so that $v=k$. With these stylus-supporting arms clamped in these positions, $wz=Uv=k$ (It would be just as satisfactory to clamp A(3$v$) in any other position, provided that the position of A(2U)—A(1U) was adjusted correspondingly. For example, if $k$ is a very large number, it may be convenient to clamp A(3$v$) so that $v=(\frac{1}{10})k$. Then A(1U)—A(2U) should be clamped so that $U=10$, so that, still, $Uv=k$.) Since $wz-Uv=0$, always, and since $Uv=k$, in this case, in this case $wz=k$. That is, the stylus-supporting arms A(3$w$) and A(2$z$) may move in any manner such that the product of the numbers on the scales SF(3$w$) and SF(2$z$) under IW($w$) and IW($z$), respectively, is equal to $k$. That is, the clamping of A(1U)—A(2U) and A(3$v$) establishes a relation between $w$ and $z$ expressed by the equation $wz=k$. Having established a relation of the desired form, it remains to record corresponding values of $w$ and $z$ in the form of a graph. It should be noted that the relation $wz=k$ was established using only the double multiplier. However, it is not possible to record this relation in the form of a graph constructed by the instrument without using curve followers CF(5), CF(9), and CF(10) of Units I and II.

To record the relation $wz=k$, use guide bar GB(9) to require the stylus of CF(9), namely S(9), to follow the straight line $y_9=x_9$, this equation describing a line on the face of BD(9), or on the paper attached to BD(9), related to the $x_9$ and $y_9$ axes on BD(9); the $x_9$ axis joining the zeros of scales SB(9.1)—SB(9.3), and the $y_9$ axis joining the zeros of the scales SB(9.2) and SB(9.4). Since S(9) moves over the curve $x_9=y_9$, whenever it moves, GB(9) having been clamped in position, the relation expressed by the equation $W=w$ is established between the corresponding positions of A(9W) and A(3$w$)—A(9$w$). In the same way, using guide bar GB(10), force S(10) to follow the line $y_{10}=x_{10}$, whenever S(10) moves, thus establishing the relation $W=V$. Now when either A(2$z$) or A(3$w$) is moved, A(9W) and A(10V) must move, as well as the other member of the pair A(2$z$)—A(3$w$). When A(2$z$) moves, A(5$z$) moves with it, and when A(10V) moves, A(5V) moves with it. Therefore, when either A(2$z$) or A(3$w$) is moved, S(5) moves, the coordinates of S(5) being ($z$, V). Since $V=W=w$, and since $wz=k$, $Vz=k$. When the point ($z$, V) moves under the constraint that $Vz=k$, the path over which it moves is defined by the equation $x_5y_5=k$, referred to the $x_5y_5$ axes oriented on BD(5) in the manner previously described. When the paper on which the graph has been traced is removed from the board, it will, in general, no longer be important to know where in the machine the curve was drawn, so that the subscripts may be dropped, and the curve labeled simply as $xy=k$, in relation to the axes drawn on the paper, these axes being colinear with the $x_5$ and $y_5$ axes when the paper is on the board BD(5).

It should be noted that the hyperbola $xy=k$ has two branches. If when the last clamps were tightened preparatory to constructing the curve $xy=k$, the point of S(5) was in the first quadrant, then only the branch of the curve $xy=k$ in the first quadrant would be drawn. To construct the other branch, loosen one of the guide bars, say GB(10), move the point of S(5) to the third quadrant, and retighten the clamps holding GB(10) in the same position it previously occupied. Then when S(5) moves it will move over the second branch of the hyperbola. (It has been assumed in this paragraph that $k$ is positive. If $k$ is negative, the branches of the curve will be in the second and fourth quadrants rather than the first and third.) Since any equation defining a hyperbola may be written in the form $xy=k$, perhaps after rotation and translation of the axes, and since a method has been described for constructing the graph of any equation of the form $xy=k$, this method may be used to construct any desired finite portion of any hyperbola. (The size of the paper on which the curve is drawn is, of course, limited by the size of the machine; but in the absence of restrictions on the scale to which the curve shall be constructed, any finite portion of any hyperbola may be constructed on any given sheet of paper. If restrictions on the scale exist, the instrument may be used to construct that portion of the hyperbola on both sides of the line $$y = \left[\frac{|k|}{k}\right](x)$$

which will fit on a sheet of paper approximately the size of any of the drawing boards.)

For example, to construct the ellipse $b^2x^2+a^2y^2=a^2b^2$, in which $a$ and $b$ are arbitrary real constants. (The trivial case, when $a=b$, reduces to the construction of a circle: To construct the circle $x^2+y^2=R^2$, in which $R=a=b$. Clamp TLA(2) to LA(2) in such a position that the number on the scale SLA(2) under IW(R) is R. Then when either A(3v) or A(3w) is moved, S(3) traces out the circle $x_3^2+y_3^2=R^2$. As before, whenever it is unimportant to know how or where this curve was constructed, the subscripts may be dropped.) To construct the ellipse $b^2x^2+a^2y^2=a^2b^2$, with $a \neq b$: Proceed as before to construct the circle $x_3^2+y_3^2=R^2$, with $R=|ab|$. This is another way of saying, "Establish the relation between $v$ and $w$ expressed by the equation $v^2+w^2=a^2b^2$." Also, using guide bar GB(9), force S(9) to follow the line $y_9=bx_9$, and, using GB(6), force S(6) to follow the line $x_6=ay_6$. Thus the relations are established that $v^2+w^2=a^2b^2$, that $w=a^2b^2$, that $w=bW$, and $v=aV$, or in other words, $b^2W^2+a^2V^2=a^2b^2$. This last equation, which is of the desired form, is graphed by S(10), which has the coordinates (W, V), or in other words $x_{10}=W$, $y_{10}=V$, so that the curve traced out on the paper attached to BD(10) by the point of S(10) is defined by the equation $b^2x_{10}^2+a^2y_{10}^2=a^2b^2$, or dropping the subscripts, $b^2x^2+a^2y^2=a^2b^2$. By translating and/or rotating the axes on the paper, by conventional means, the equation defining this curve may be changed; so that the procedure described in this paragraph, together with the conventional procedure for translating and/or rotating the axes, is sufficient to construct any ellipse, in the absence of requirements defining the scale to which a particular ellipse shall be drawn. (Such scale requirements, if any, would be derived from considerations of the purpose of the operator in constructing a particular curve; as far as the function generator and control mechanism is concerned the operator may choose any convenient scale; in particular, he may always choose a scale which will permit construction of the entire ellipse on a sheet of paper of any specified size.)

For example, to construct any desired portion of any parabola: Clamp A(3w) in such a position that $w=1$, so that $z-Uv=0$. Using GB(1) and GB(6), constrain S(1) and S(6) to move over the lines $y_1=x_1$ and $$x_6=ay_6+b$$

respectively, in which $a$ and $b$ are arbitrary real constants, thus establishing the relations $u=U$ and $v=aV+b$, so that $z-u(aV+b)=0$. Using GB(4), constrain S(4) to move over the curve $y_4=x_4$, so that $u=V$, so that $z-V(aV+b)=z-aV^2+bV=0$. Then when S(5) is moved, it moves over and traces out a portion of the curve $x_5=ay_5^2+by_5$, since the coordinates of S(5) are $x_5=z$, $y_5=V$. If new $x_5^1y_5^1$ axes are chosen on the paper attached to BD(5) such that $x_5^1-c=x_5$, $y_5^1=y_5$, in which $c$ is any arbitrary real constant, then the curve over which S(5) moves may be defined by the equation $$x_5^1 = ay_5^{12}+by_5^1+c$$

or, dropping the subscripts and primes, $x=ay^2+by+c$. Since it is possible by properly choosing the scale to construct any finite portion of this parabola, it is possible to construct any finite portion of any parabola.

The equation $x=ay^2+by+c$ is of the form $$x = \sum_{i=0}^{n} a_i y^i$$

in this case $n=2$, $a_0=c$, $a_1=b$, $a_2=a$. In general, Units I and II may be used to construct the graph of any equation of this form, for $n$ any integer greater than or equal to zero. To construct the curve $$x = \sum_{i=0}^{0} a_i y^i = a_0$$

clamp A(3v), for example, in such a position that $v=a_0$. Then when S(3) moves it moves over the line $x=a_0$. To construct the curve $$x = \sum_{i=0}^{1} a_i y^i = a_1 y + a_0$$

use GB(3), for example. The construction for $n=2$ has been described. It should be noted that, in constructing the curve for $n=2$, it is first necessary to construct the curve for $n=1$; that is, in constructing the curve $$x=ay^2+by+c$$

S(6) was required to move over the line $x=ay+b$. In general, for constructing the curve for $n=m$, $m>1$, it is first necessary to construct the curve for $n=m-1$. For example, to construct the curve $$x = \sum_{i=0}^{3} a_i y^i = a_3 y^3 + a_2 y^2 + a_1 y + a_0$$

it is first necessary to construct the curve $$x = \sum_{i=0}^{2} a_{i+1} y^i = a_3 y^2 + a_2 y + a_1$$

by the method described above or by any other method. To construct the curve $$x = \sum_{i=0}^{3} a_i y^i = a_3 y^3 + a_2 y^2 + a_1 y + a_0$$

place the paper on which the curve $$x = \sum_{i=0}^{2} a_{i+1} y^i$$

has been constructed, by the method described above or by any other method, on BD(6) such that the $x$-axis of the graph joins the zeros of the scales SB(6.1)—SB(6.3) and such that the $y$-axis of the graph joins the zeros of the scales SB(6.2)—SB(6.4), so that the equation of the curve on the paper becomes $$x_6 = \sum_{i=0}^{2} a_{i+1} y_6^i$$

referred to the $x_6 y_6$ axes. With A(3w) clamped so that $w=1$, with the styli of S(1) and S(4) constrained by GB(1) and GB(4) to follow the curves $y_1=a_1$ and $y_4=x_4$, respectively, and with the point of S(6) on the curve $$x_6 = \sum_{i=0}^{2} a_{i+1} y_6^i$$

the following relations are established between the variables $u$, $U$, $v$, $V$, $w$, and $z$: $w=1$, $z=Uv$; $U=u=V$;

$$v = \sum_{i=0}^{2} a_{i+1} V^i$$

Therefore $$z = V\sum_{i=0}^{2} a_{i+1}V^i = (a_3V^2 + a_2V + a_1)V = a_3V^3 + a_2V^2 + a_1V$$

or $$z = \sum_{i=1}^{3} a_iV^i$$

and the curve traced out, by S(5): $(z, V)$, is defined by the equation $$x_5 = \sum_{i=1}^{3} a_iy_5^i$$

If now the equation of the curve is referred to the $x_5\ y_5$ axes, $s_5 - a_0 = x_5$, $y_5 = y_5$, then the equation is $$x_5 = a_0 + \sum_{i=1}^{3} a_iy_5^i = \sum_{i=0}^{3} a_iy^i$$

which is the desired curve.

In general, if the curves over which S(1), S(3), S(4), and S(6) move are defined by the equations $$f_1(x_1, y_1) = y_1 - F_1(x_1) = 0$$

$f_3(x_3, y_3) = y_3 - F_3(x_3) = 0$, $f_4(x_4, y_4) = x_4 - F_4(y_4) = 0$, and $f_6(x_6, y_6) = x_6 - F_6(y_6) = 0$, respectively, then the relations $U = F_1(u)$, $w = F_3(v)$, $u = F_4(V)$, and $v = F_6(V)$ are established; by substituting these values in the equation $wz - Uv = 0$, one obtains $$z = \frac{F_6(V)F_1[F_4(V)]}{F_3[F_6(V)]}$$

so that the point of S(5), namely $(z, V)$ is a point of the curve $$x_5 = \frac{F_6(y_5)F_1[F_4(y_5)]}{F_3[F_1(y_5)]}$$

In the case, described above, in which $F_1(u) = u$, $F_3(v) = 1$, $F_4(V) = V$, and $F_6(V) = a_2V + a_1$, $$z = a_2V^2 + a_1 V$$

so that the curve which S(5) traces out is defined by the equation $x_5 = a_2y_5^2 + a_1y_5$, referred to the $x_5y_5$ axes, or $x_5^1 = a_2y_5^{12} + a_1y_5^1 + a_0$, referred to the $x_5^1y_5^1$ axes, in which $x_5^1 - a_0 = x_5$ and $y_5^1 = y_5$. In the case, described above, in which $F_1(u) = u$, $F_3(v) = 1$, $F_4(V) = V$, and $$F_6(V) = a_3V^2 + a_2V + a_1$$

$z = a_3V^3 + a_2V^2 + a_1V$, so that the curve which S(5) traces out is defined by the equation $$x_5 = a_3y_5^3 + a_2y_5^2 + a_1y_5 = \sum_{i=1}^{3} a_iy_5^i$$

referred to the $x_5y_5$ axes, or by the equation $$x_5^1 = \sum_{i=0}^{3} a_iy_5^{1i}$$

referred to properly chosen $x_5^1y_5^1$ axes. In general, if $F_1(u) = u$, $F_3(v) = 1$, $F_4(V) = V$, and $$F_6(V) = \sum_{i=0}^{n-1} a_{i+1}V^i$$

then $$z = F_5(V) = \sum_{i=1}^{n} a_iV^i$$

so that the curve traced out by S(5) is defined by the equation $$x_5 = \sum_{i=1}^{n} a_iy_5^i$$

referred to the $x_5y_5$ axes, or by the equation $$x_5^1 = \sum_{i=0}^{n} a_iy_5^{1i}$$

referred to properly chosen $x_5^1y_5^1$ axes. That is, this procedure, of taking the curves produced by the stylus S(5), translating the origin, and then placing the curve on BD(6) so that the new axes coincide with the $x_6y_6$ axes and in this position forcing S(6) to follow the curve, may be used to construct the graph of any equation of the form $$x = \sum_{i=0}^{n} a_iy^i$$

dropping the subscripts and primes. In other words, this procedure may be used to construct the graph of the equation $$x = \sum_{i=0}^{n} a_iy^i$$

for $n = 2$; and if this procedure may be used to construct the graph of the equation $$x = \sum_{i=0}^{n} a_iy^i$$

for $n = m$ it may be used to construct the graph of the equation $$x = \sum_{i=0}^{n} a_iy^i$$

for $n = m+1$, in which $m$ is any integer greater than 1; therefore, this procedure may be used to construct the graph of any equation of the form $$x = \sum_{i=0}^{n} a_iy^i$$

for $n$ any integer greater than 1. (Slightly different procedures, previously described, permit the construction, using any curve follower except CF(2), of the graph of the equation $$x = \sum_{i=0}^{n} a_iy^i$$

for $n = 0$, $n = 1$. Therefore, Units I and II may be used together to construct the graph of any equation of the form $$x = \sum_{i=0}^{n} a_iy^i$$

for $n$ any integer greater than or equal to zero.) This procedure is summarized in Table 6:

TABLE 6

*Column 1*

$S(1): (u, U),\ y_1 = F_1(x_1),\ U = F_1(u)$
$S(3): (v, w),\ y_3 = F_3(x_3),\ w = F_3(v)$
$S(4): (u, V),\ x_4 = F_4(y_4),\ u = F_4(V)$
$S(6): (v, V),\ x_6 = F_6(y_6),\ v = F_6(V)$
$S(5): (z, V),\ x_5 = F_5(y_5),\ z = F_5(V)$
$\qquad = (Uv/w)$
$\qquad = \dfrac{F_1[F_4(V)]F_6(V)}{F_3[F_6(V)]}$

*Column 2*

$F_1(u) = u$
$F_3(v) = 1$
$F_4(V) = V$ $$F_6(V) = a_2V + A_1 = \sum_{i=0}^{1} a_{i+1}V^i$$

$$z = a_2V^2 + a_1V = \sum_{i=1}^{2} a_iV^i$$

$$X_5{}^1 = a_2 y_5{}^{1^2} + a_1 y_5{}^1 + a_0 = \sum_{i=0}^{2} a_i y_5{}^{1^i}$$

*Column 3*

$F_1(u) = u$
$F_3(v) = 1$
$F_4(V) = V$ $$F_6(V) = \sum_{i=0}^{2} a_{i+1} V^i$$

$$z = \sum_{i=1}^{3} a_i V^i$$

$$X_5{}^1 = \sum_{i=0}^{3} a_i (y_5{}^1)^i$$

*Column n*

$[n \geq 2]$ $F_1(u) = u$
$F_3(v) = 1$
$F_4(V) = V$ $$F_6(V) = \sum_{i=0}^{n-1} a_{i+1} V^i$$

$$z = \sum_{i=1}^{n} a_i V^i$$

$$X_5{}^1 = \sum_{i=0}^{n} a_i (y_5{}^1)^i$$

Column 1 of Table 6 lists the styli directly involved in the construction of the graph of the equation $$x = \sum_{i=0}^{n} a_i y^i$$

$n \geq 2$; the coordinates of the respective styli; the equations of the curves over which the styli move; and the relations established by the movements of the styli between the coordinates of the styli, in general. Column 2 lists the particular forms which the various functions $F_i$, $i = 1, 3, 4, 6$, take in order to establish the relation $$F_5(V) = \sum_{i=1}^{2} a_i V^i$$

When $F_5(V)$ is defined in this manner, $S(5)$ moves over the parabola $$x_5{}^1 = \sum_{i=0}^{2} a_i (y_5{}^1)^i$$

$x_5{}^1 y_5{}^1$ axes being properly chosen. Column 3 lists the particular forms which the various functions $F_i$ $i = 1, 3, 4, 6$, take in order to establish the relation $$F_6(V) = \sum_{i=1}^{3} a_i V^i$$

when $F_5(V)$ is defined in this manner, $S(5)$ moves over the curve defined by the equation $$x_5{}^1 = \sum_{i=0}^{3} a_i (y_5{}^1)^i$$

the $x_5{}^1 y_5{}^1$ axes being properly chosen. It should be noted that the entry in column 3, row 4, of Table 6 is essentially the same as the entry in column 2, row 5, of Table 6. That is, having constructed the curve $$x_5{}^1 = \sum_{i=0}^{2} a_i (y_5{}^1)^i$$

this curve may be taken from BD(5) and placed on BD(6) to be used as a guide for S(6) in constraining S(5) to move over the curve $$x_5{}^1 = \sum_{i=0}^{3} a_i y_5{}^{1^i}$$

This repetitive process leads to the construction, as indicated in column n of Table 6, of the curve defined by the equation $$x_5{}^1 = \sum_{i=0}^{n} a_i y_5{}^{1^i}$$

or, dropping the primes and subscripts, $$x = \sum_{i=0}^{n} a_i y^i$$

(The names identifying the arbitrary constants have been changed between columns 2, 3, and n of Table 6: $a_i$ in column 2 is $a_{i+1}$ in column 3 and column n.)

To construct the graph of the equation $$x = \frac{\sum_{i=0}^{n} a_i y^i}{\sum_{i=0}^{m} b_i y^i}$$

with $m = 0$, proceed as before to construct the graph of the equation $$x = \sum_{i=0}^{n} a_i y^i$$

Place this curve on BD(6) so that the x-axis of the graph is colinear with the $x_6$ axis joining the zeros of the scales SB(6.1)—SB(6.3) and so that the y-axis of the graph is colinear with the $y_6$ axis joining the zeros of the scales SB(6.2)—SB(6.4), so that the curve may be defined by the equation $$x_6 = \sum_{i=0}^{n} a_i y_6{}^i$$

Using guide bars GB(9) and GB(10), constrain the points of S(9) and S(10) to follow the lines $x_9 = y_9$ and $x_{10} = b_0 y_{10}$, respectively. Remove the clamps holding A(3w)—A(9w). Then, with S(1) and S(4) moving over the lines $x_1 = y_1$ and $x_4 = y_4$, respectively, $u = U = V$, $$v = \sum_{i=0}^{n} a_i v^i$$

and $w = W = b_0 V$, so that $$z = Uv/w = \frac{V \sum_{i=0}^{n} a_i v^i}{b_0 V} = \frac{\sum_{i=0}^{n} a_i v^i}{b_0}$$

so that the equation of the curve over which S(5) moves is $$x_5 = \frac{\sum_{i=0}^{n} a_i y_5{}^i}{\sum_{i=0}^{0} b_i y_5{}^i}$$

To construct the graph of the equation $$x = \frac{\sum_{i=0}^{n} a_i y^i}{\sum_{i=0}^{m} b_i y^i}$$

with $m \geq 1$, proceed as before to construct the two curves, separately, defined by the equations $$x = \sum_{i=0}^{n} a_i y^i$$

and $$x = y \sum_{i=0}^{m} b_i y^i \sum_{i=1}^{m+1} b_{i-1} y^i$$

Place the curve $$x = \sum_{i=0}^{n} a_i y^i$$

on BD(6) so that the x-axis of the graph is colinear with the $x_6$ axis and so that the y-axis of the graph is colinear with the $y_6$ axis, so that when S(6) moves over the curve, $$v = \sum_{i=0}^{n} a_i V^i$$

In the same way, place the curve $$x = \sum_{i=1}^{m+1} b_{i-1} y^i$$

on BD(10) so that the $x$-axis of the graph is colinear with the $x_{10}$ axis joining the zeros of the scales SB(10.1)—SB(10.3), and so that the $y$-axis of the graph is colinear with the $y_{10}$ axis joining the zeros of the scales SB(10.2)—SB(10.4), so that, when the point of S(10) moves over the curve, $$W = \sum_{i=0}^{m+1} b_{i-1} V^i$$

Remove the clamps holding A (3w)—A(9w). Using GB(9), constrain the point of S(9) to follow the line $y_9 = x_9$. Now when any of the movable parts of Units I and II is moved, with S(6) and S(10) being manually or otherwise constrained to follow their respective curves, all of the other movable parts of Units I and II are constrained to move, the relations established by these movements between the variables $u$, $U$, $v$, $V$, $w$, $W$, and $z$ being expressed by the simultaneous equations $u = U = V$, $$w = W = \sum_{i=1}^{m+1} b_{i-1} V^i, \quad v = \sum_{i=0}^{n} a_i V^i$$

and $z = Uv/w$, or in other words, $$z = \frac{V \sum_{i=0}^{n} a_i V^i}{\sum_{i=1}^{m+1} b_{i-1} V^i} = \frac{V \sum_{i=0}^{n} a_i V^i}{V \sum_{i=0}^{m} b_i V^i} = \frac{\sum_{i=0}^{n} a_i V^i}{\sum_{i=0}^{m} b_i V^i}$$

so that the curve over which S(5) moves is defined by the equation $$x = \frac{\sum_{i=0}^{n} a_i y^i}{\sum_{i=0}^{m} b_i y^i}$$

as required. Whenever desired, any of the coefficients $a_i$ or $b_i$ after the first may be set equal to zero. Also, in many particular cases, various shortcuts are possible. For example, to construct the graph of the equation $$x = \frac{a_3 y^3 + a_1 y + a_0}{b_5 y^5 + b_1 y}$$

Using GB(1) and GB(4), establish the relations $U = u = V$. Clamp A(3w) so that $w = 1$. Using GB(6), establish the relation $v = a_3 V$. Then as S(5) is moved it traces out the graph of the equation $x = a_3 y^2$. Place this curve on BD(4), so that the $x$-axis of the graph is colinear with the $x_4$ axis and so that the $y$-axis of the graph is colinear with the $y_4$ axis, so that S(4) may be guided over the curve $x_4 = a_3 y_4^2$, thus establishing the relation $u = a_3 V^2$. Using GB(1), establish the relation $U = u + a_1$; and using GB(6) establish the relation $v = V$. Then when S(5) is moved it moves over the curve $x_5 = a_3 y_5^3 + a_1 y_5$. If the $x_5^1 y_5^1$ axes are related to the $x_5 y_5$ axes by the equations $x_5 + a_0 = x_5^1$, $y_5 = y_5^1$, then the curve over which S(5) moves is defined by the equation $x_5^1 = a_3 y_5^{13} + a_1 y_5^1 + a_0$. Set this curve aside temporarily. Using guide bars GB(1), GB(4), and GB(6), establish the relations $u = U = V = v$. With $w = 1$, as S(5) is moved it traces out the parabola $x = y^2$. Set the curve $x = y^2$ aside and construct a second curve $x = y^2$ on a different sheet of paper. Place one of the curves $x = y$ on BD(4) to produce the relation $u = V^2$, and place the second curve $x = y^2$ on BD(6) to establish the relation $v = V^2$. Using GB(1), establish the relation $U = b_5 u$. Then when S(5) is moved, while S(4) and S(6) are being guided, manually or otherwise, over the curves $x_4 = y_4^2$ and $x_6 = y_6^2$, the point of S(5) traces out the curve $x_5 = b_5 y_5^4$. Place this curve on BD(4), to establish the relation $u = b_5 V^4$. Leave the curve $x = y^2$ on BD(6), to maintain the relation $v = V^2$. Use GB(1) to establish the relation $U = u + b_1$. With $w = 1$, when S(5) is moved, S(4) and S(6) being guided over their respective curves, the point of S(5) traces out the curve $x = y^2(b_5 y^4 + b_1)$. Remove the clamps holding A (3w) and establish the relation $w = W$, using GB(9). Place the curve $$x = y^2(b_5 y^4 + b_1)$$

on BD(10) to establish the relation $W = V^2(b_5 V^4 + b_1)$. Place the curve $x = a_3 y^3 + a_1 y + a_0$ on BD(6) to establish the relation $v = a_3 V^3 + a_1 V + a_0$. Use guide bars GB(1) and GB(4) to establish the relations $u = U = V$. Then when S(6) and S(10) are guided over their respective curves, S(5) traces out the curve $$x = \frac{a_3 y^3 + a_1 y + a_0}{b_5 y^5 + b_1 y}$$

which is the required curve.

In general, while S(5) is tracing out the rational curve $$x = \frac{\sum_{i=0}^{n} a_i y^i}{\sum_{i=0}^{m} b_i y^i}$$

S(3) traces out the curve defined by the parametric equations $$x = \sum_{i=0}^{n} a_i V^i$$

$$y = \sum_{i=1}^{m+1} b_{i-1} V^i$$

In the example of the last paragraph, this is the curve $$x = a_3 V^3 + a_1 V + a_0$$

$$y = V^2(b_5 V^4 + b_1)$$

In general, if the curve on BD(6) is defined by the equation $x = F_6(y)$, and if the curve on BD(10) is defined by the equation $x = F_{10}(y)$, and if the curve on BD(9) is defined by the equation $y = F_9(x)$, then the curve traced out by the point of S(3), as the points of S(6), S(10), and S(9) are guided over their respective curves, is defined by the parametric equations $$x = F_6(V)$$
$$y = F_9[F_{10}(V)]$$

If, for example, $F_6(V)$ is represented by the curve $$x = \frac{\sum_{i=0}^{n} a_i y^i}{\sum_{i=0}^{m} b_i y^i}$$

$F_{10}(V)$ is represented by some other curve $$x = \frac{\sum_{i=0}^{p} c_i y^i}{\sum_{i=0}^{q} d_i y^i}$$

and F(9) is represented by the straight line $y = x$, then the curve traced out by S(3) is defined by the parametric equations $$x = F_6(V) = \frac{\sum_{i=0}^{n} a_i V^i}{\sum_{i=0}^{m} b_i V^i}$$

$$y = F_{10}(V) = \frac{\sum_{0}^{p} c_i V^i}{\sum_{0}^{q} d_i V^i}$$

in which both $F_6(V)$ and $F_{10}(V)$ are arbitrary rational functions of the real variable V.

It should be noted that the ability of the machine to construct the graph of any equation of the form $$x = \sum_{i=0}^{n} a_i y^i$$

implies that the machine may be used to construct the graph of the equation $y=\sin x$, for example, or $y=e^x$, as accurately as may be desired. Since $$\sin x = x - x^3/3! + x^5/5! - x^7/7! + \ldots$$

and since the graph of as many terms of this equation as may be desired may be constructed, the graph of the equation $y=\sin x$ may be approximated, as closely as desired. (The mechanical accuracy of the machine depends, of course, on the quality of the workmanship and materials used in its construction—a perfectly accurate machine would construct the graph of the equation $y=\sin x$, accurately as might be desired.) In the same manner, using series, it is possible to construct the graph of the equation $y=e^x$, as accurately as may be desired, or of any other equation which may be expressed in series form, providing that the general term of the series is $$"\sum_{i=0}^{n} a_i x^i"$$

or $$"\sum_{i=0}^{n} a_i x^i \Big/ \sum_{i=0}^{m} h_i x^i"$$

for example.

It has been convenient to assume, throughout the preceding discussion, that all scales were everywhere equal. This is not necessarily the case: the operator may always choose convenient scales. For example, given some curve whose equation is unknown, to construct this curve to a different scale, for example such that the $x$ scale remains unchanged while the unit distance along the $y$-axis is doubled. Place the given curve on BD(6); using GB(10) and GB(9) constrain S(10) and S(9) to follow the lines $y=x$ and $y=2x$, respectively, thus establishing the relations $V=W$ and $w=2W$. When the point of S(6) is on the given curve, the point of S(3) is a corresponding point of the derived curve; the relation between the points of S(3) and S(6) being given by the equations $$x_3 = v = x_6$$
$$y_3 = w = 2W = 2V = 2y_6$$

In a similar manner, the scale to which any given curve is drawn may be changed in a large variety of ways, either linearly or non-linearly, on either or both axes. (If a curve defined by some equation $y_3 = f_3(x_3)$ is traced over by S(3), if the curves over which S(6) and S(9) move are defined by the equations $x_6 = y_6$ and $x_9 = y_9$, respectively, then the curve over which S(10) moves is defined by the equation $x_6 = f_3(y_6)$. This particular transformation is equivalent to rotating the given curve through 90° counterclockwise about an axis through the origin perpendicular to the plane of the curve; and then rotating the given curve through 180° about the old $x$-axis. The first of these rotations changes $x$ into $y$ and $y$ into $-x$; and so is expressed by the equations $x=y^1$ and $y=-x^1$. The second of the two rotations is described by the equations $-x^1=x^{11}$, $y^1=y^{11}$, so that an equation $y=f(x)$ becomes $x^{11}=f(y^{11})$. In general, if the curves on BD(9), BD(3), and BD(6) are defined by the equations $y_9=f_9(x_9)$, $x_3=f_3(y_3)$, and $y_6=f_6(x_6)$, respectively, then the curve on BD(10) is defined by the equation $y_{10}=f_6(f_3[f_9(x_{10})])$. That is, if each of the three curves $y=f_9(x)$, $x=F_3(y)$, and $y=f_6(x)$ are given or may be constructed, then $y=f_6(f_3[f_9(x)])$ may be constructed.

Having described typical procedures for constructing any of a very large number of different curves, or for constructing an approximation of any of a very large number of other curves, the approximation being as close as desired, or for transforming any given curve in very general ways; certain other capabilities of the Function Generator and Control Mechanism may be described, these other capabilities being partly dependent on the existence of such curves.

For example, if S(1) moves over the curve $y_1=f_1(x_1)$, so that $U=f_1(u)$, and if in the same manner the relations expressed by the equations $w=f_9(W)$ and $v=f_6(V)$ are established, then, since $wz-Uv=0$, $$zf_9(W) = f_1(u) \cdot f_6(V)$$

or in other words, the position of A(2z) depends on the positions of A(1u), A(4V), and A(9W). If, for example, A(1u) is connected to a motor which is in turn connected to a temperature gauge, so that the position of A(1u) at any time is made to depend directly on a temperature, and if in the same way the positions of A(4V), and A(9W) are made to depend on a velocity and on a pressure respectively, for example, then the product of a function of a temperature by a function of a velocity divided by a function of a pressure determines the position of A(2z). If A(2z), in this example, were connected to a motor which in turn controlled the tension in a spring so that the tension was directly dependent on the position of A(2z), then the tension in the spring would be numerically equal to $$f_1(u) \cdot f_6(V)/f_9(W)$$

appropriate units having been chosen for the temperature $u$, the velocity V, and the pressure W. In this example, the effect on the tension $z$ of changes in $f_1$, $f_6$, and/or $f_9$, could be easily determined, experimentally, by changing the curve on BD(1), and/or on BD(6), and/or on BD(9).

In the preceding example, the three variables $u$, V, and W were so interrelated as to control, together, the fourth variable $z$. In this case, the values of U, $v$, and $w$ were irrelevant. However, A(2U) could have been connected to some other instrument, just as A(2z), A(1u), and A(4V) were connected to other instruments; and in the same way A(3w) and A(3v) could have been connected to parts of one or more other instruments. In general, when S(1) moves over the curve $y_1=f_1(x_1)$, S(6) moves over the curve $x_6=f_6(y_6)$, and S(9) moves over the curve $y_9=f_9(x_9)$, then $u$, V, and W control $z$, $u$ controls U, V controls $v$, and W controls $w$, so that $u$, V, and W controls $z$, U, $v$, and $w$ or; $z$ and any combination of U, $v$, and $w$, depending on the intent of the operator.

If the position of each of six of the seven stylus-supporting arm combinations is expressed in terms of the seventh, then a method has been described for using one variable to control six others. For example, if S(4) moves over the curve $x_4=f_4(y_4)$, so that $u=f_4(V)$, and in the same way the relations $U=f_1(u)=f_1[f_4(V)]$, $v=f_6(V)$, $$w=f_3(v)=f_3[f_6(V)]=f_9(W)=f_9[f_{10}(V)]$$

$W=f_{10}(V)$, and $$z=f_5(V)=Uv/w$$
$$=f_6(V)f_1[f_4(V)]/f_3[f_6(V)]$$
$$=f_6(V)f_1[f_4(V)]/f_9[f_{10}(V)]$$

are established, then the position of A(4V) determines the positions of A(1u), A(2U), A(2z), A(3v), A(3w), A(9W). The manner in which the position of, say, A(1u) depends on the position of A(4V) may be easily changed by the operator, and in the same way he may change the functional relation existing between the corresponding positions of A(4V) and any of the stylus-supporting arms A(2U), A(3v), A(3w), and A(2z); merely by changing the proper curve. Many other similar possibilities exist.

For example, if A(2z) is clamped so that z=1, if the curve over which S(1) moves is defined by the equation $y_1=f_1(x_1)$, if the curve over which S(6) moves is defined by the equation $x_6=f_6(y_6)$, and if the curve over which S(9) moves is defined by the equation $$y_9=f_9(x_9)$$

then the relations are established that $U=f_1(u)$, $$v=f_6(V)$$

and $w=f_9(W)$. Since $w=Uv$, in this case, $$f_9(W)=f_1(u)f_6(V)$$

If A(1u) is connected to a control which determines the directed distance in a particular direction through which the point of a three dimensional cutting tool has moved; if in the same way A(4V) is connected to a control which determines the directed distance, in a direction at right angles to the direction of movement of the cutting point as determined by A(1u), of the point of the cutting tool; and if in the same way the motion in the third direction is controlled by A(9W), then the point of the cutting tool will move along some curve on the surface defined by the equation $$f_9(W)=f_1(u)f_6(V)$$

as S(1), S(6) and S(9) are moved over their respective curves. In this manner the point of the cutting tool may be moved over any path whatever on the surface, to cut out the surface from a solid block of material.

It should be noted that, in the same manner that the Function Generator and Control Mechanism may be connected to another different instrument or to parts of several different instruments, directly or indirectly, to control the relative positions of parts of the other instrument or instruments, so the Function Generator and Control Mechanism is adapted to be directly connected to a second Function Generator and Control Mechanism interchangeable with the first, in any of a large variety of ways. For example, connecting rods similar to C(1u) may be used to link A(2z–1) to A(2U–2), A(1u–1) to A(2z–2), etc. In this manner the number of variables may be increased indefinitely, and the number of different relations which may be established between them may also be increased indefinitely, by interconnecting as many Function Generators to each other as may be desired.

The embodiment of the Function Generator and Control Mechanism shown in the drawings and described above is illustrative only, and not the only possible embodiment. For example, the straight rigid members have been shown as being square or rectangular in cross section—they might just as well be triangular or hexagonal or round. If F(3v.1) and F(3v.2) are straight rigid tubes, for example, then the carriages TF(3v.1) and TF(3v.2) could be equipped with ball bearings held in a circular race. Or F(3v.1) might be equipped with rails and TF(3v.1) with flanged wheels to fit these rails. It is important only that A(3v) shall be free to move in a direction perpendicular to its longitudinal centerline and only in this direction, and that TA(3v) shall be free to move along A(3v) in the direction of the longitudinal centerline of A(3v) and essentially only in this direction. The pillars do not need to stand on the corners of a square, though any change in this particular would involve a reduction in the number of interchangeable parts. Unit II need not stand beside Unit I—Units I and II could be arranged vertically one above the other. A more important change than any of these involves the addition of a stylus to CF(2), to make possible the recording in the form of a graph of corresponding simultaneous values of U and z. To avoid interference between the movements of the stylus S(2) and LA(1), S(2) could be attached to the top of TA(2U), as shown in FIGURES 21 and 22. In this position S(2) will trace out a curve on the paper attached to the bottom of BD(1). If BD(1) is transparent, S(2) could be guided over such a curve. In general, to make easier the task of moving any stylus over a particular curve, photo electric devices may be incorporated in the system to make the curve followers completely automatic, or hand cranks connected to the stylus-supporting arms by means of gears may be easily attached to the instrument. Verniers may be added, either separately or in conjunction with the hand cranks.

A more important change consists in making the rigid connections between parallel stylus-supporting arms detachable. Thus if C(1u) and C(2u) were clamped between A(1u) and A(4u) they could be easily removed, thus freeing A(4u) from any constraint directly imposed by A(1u), and vice versa. In this case, since the longitudinal centerlines of A(1u) and A(4u) could be moved different distances from their respective neutral positions, simultaneously, these distances could not both be represented by the same letter, so that the breaking of the rigid connection between these stylus-supporting arms is equivalent to the introduction of a new variable. In this manner, a total of sixteen variables could be defined. (If LA(1) were clamped to TL(1) and TD(2) in such a way that it could be unclamped and slipped through TLA(1) and so removed from the double multiplier, the relation expressed by the equation $wz-Uv=0$ between corresponding positions of A(2z), A(2U), A(3v), and A(3w) would no longer hold.) Whenever a rigid connection between two stylus-supporting arms is broken, a new scale and indicator wire should be added to the appropriate members of one of the curve followers, in order to make reading values of the new variable convenient. It should be noted that if C(1V) and C(2V) are broken between A(6V) and A(5V), the pieces including A(4V) and A(5V) and/or A(6V) and A(10V) are each interchangeable with the piece including A(1U) and A(2U) or with the piece including A(3w) and A(9w). If it is desired that A(4V) and A(6V) move together, and also that A(5V) and A(10V) move together, the members of one of these pairs may be connected to each other in the following manner: Attach straight rigid members at each end of A(5V), say, perpendicular to A(5V) and to the pillars P(i.II), $1 \leqslant i \leqslant 4$, and interchangeable straight rigid members to each end of A(10V), perpendicular to A(10V) and to the pillars. If the lengths of these four interchangeable straight rigid members are at least equal to the length of F(4V.2), then these members may be rigidly connected to each other in pairs by straight rigid members parallel to the pillars, such that A(5V) and A(10V) are constrained to move together and such that their movement will not interfere with the movement of A(4V)—A(6V), A(4V) and A(6V) being connected to each other by straight rigid members parallel to the pillars.

Having thus described the invention, what is claimed as new and desired to be secured by Letters Patent is:

1. A mechanical computing device comprising a frame, two curve followers, each including a pair of perpendicular carriage-supporting arms slidably mounted on said frame, and a double carriage slidably mounted on each pair of arms, a stylus mounted on at least one of said double carriages, said frame connecting said two curve followers such that each carriage-supporting arm of each curve follower is parallel to one of the carriage-supporting arms of the other curve follower, and means rotatably mounted on said frame slidably connecting the double carriage of one curve follower to the double carriage of the other curve follower.

2. A mechanical computing device comprising a frame, two curve followers, each including a pair of perpendicular stylus-supporting arms slidably mounted on said frame, and a stylus slidably mounted on each pair of arms, said frame connecting the said two curve followers such that each stylus-supporting arm of each curve follower is parallel to one of the stylus-supporting arms of the other curve follower, parallel arm means rotatably mounted on said frame slidably connecting said styli, a first drawing board perpendicular and contiguous to one stylus and a second drawing board parallel to the first drawing board and contiguous the other stylus, whereby one of the styli may be moved freely along any continuous segment of any plane curve on said first drawing board, thus partially restricting the movement of the other stylus relative to said second drawing board.

3. In a mechanical double multiplier the combination comprising a frame, two curve followers, each including a pair of perpendicular stylus-supporting arms slidably mounted on said frame, and a stylus slidably mounted on each pair of arms, a movable link slidably mounted on said frame and including two parallel stylus-connecting arms, each stylus being slidably mounted on one of said stylus-connecting arms to permit movement in the direction of the longiutdinal centerline of said last-mentioned arm and in essentially no other direction with respect to said last-mentioned arm, said frame including means connecting each of the curve followers such that each stylus-supporting arm of each curve follower is parallel to one of the stylus-supporting arms of the other curve follower, and the longitudinal centerline of each of the stylus-connecting arms lies in a plane parallel to the planes containing each of the stylus-supporting arms.

4. A mechanical computing device comprising a frame, two sets of two curve followers, each curve follower including a pair of perpendicular stylus-supporting arms slidably mounted on said frame, and a stylus slidably mounted on each pair of stylus-supporting arms, means connecting the two curve followers of each set such that each stylus-supporting arm of that set is parallel to one of the stylus-supporting arms of the other curve follower of that set, means connecting two of the parallel stylus-supporting arms of each set, and means interconnecting the four styli such that each stylus is individually connected to a different stylus of the other set.

5. In a mechanical computing device the combination comprising a rigid rectangular frame, two sets of two curve followers each curve follower including a pair of perpendicular stylus-supporting arms slidably mounted on said frame, and a stylus slidably mounted on each pair of arms, said frame including means rigidly connecting said stylus-supporting arms such that each stylus-supporting arm of each curve follower of that set is parallel to one of the stylus-supporting arms of the other curve follower of that set, linkage means interconnecting the said curve followers such that each stylus is individually connected to a different stylus of the other set, said device further comprising an additional two sets of two curve followers identical to the first-mentioned two sets of two curve followers, said additional two sets of two curve followers being slidably mounted on said frame, wherein each stylus-supporting arm of each curve follower is parallel to one of the stylus-supporting arms of each of the other curve followers, and linkage means interconnecting each of the styli to one of the other styli, said linkage means permitting movement of said styli relative to each other along parallel lines while preventing movement of said connected styli relative to each other in any other direction.

6. A mechanical computing device according to claim 5 further comprising a pair of parallel arms rotatably mounted on said frame, each of said last mentioned arms being coupled to at least one stylus.

References Cited in the file of this patent

UNITED STATES PATENTS

| | | |
|---|---|---|
| 1,861,192 | Sander | May 31, 1932 |
| 2,210,938 | Garrett | Aug. 13, 1940 |
| 2,300,401 | Basler | Aug. 13, 1940 |
| 2,442,098 | Shewell et al. | May 25, 1948 |
| 2,692,377 | Brettell | Oct. 19, 1954 |
| 2,814,115 | Hurwitz | Nov. 26, 1957 |
| 2,857,234 | Murray | Oct. 21, 1958 |
| 2,872,272 | Schuck | Feb. 3, 1959 |

FOREIGN PATENTS

| | | |
|---|---|---|
| 476,387 | Germany | June 4, 1929 |
| 342,420 | Italy | July 31, 1936 |